US009019201B2

(12) United States Patent
Holmdahl et al.

(10) Patent No.: US 9,019,201 B2
(45) Date of Patent: Apr. 28, 2015

(54) EVOLVING UNIVERSAL GESTURE SETS

(75) Inventors: Todd Eric Holmdahl, Redmond, WA (US); Ian LeGrow, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 12/684,556

(22) Filed: Jan. 8, 2010

(65) Prior Publication Data

US 2011/0169726 A1    Jul. 14, 2011

(51) Int. Cl.
G06F 3/01        (2006.01)
G06K 9/00        (2006.01)

(52) U.S. Cl.
CPC ............ *G06F 3/017* (2013.01); *G06K 9/00342* (2013.01)

(58) Field of Classification Search
USPC ..................... 345/156; 348/155; 382/103, 278
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Microsoft Researches Universal Gestures—Published Date: Apr. 8, 2009 http://theclevermonkey.blogspot.com/2009/04/microsoft-researches-universal-gestures.html.

(Continued)

*Primary Examiner* — Christopher E Leiby
(74) *Attorney, Agent, or Firm* — Gregg Wisdom; Micky Minhas

(57) ABSTRACT

In a gesture-based system, gestures may control aspects of a computing environment or application, where the gestures may be derived from a user's position or movement in a physical space. Gesture recognition data, used to recognize gestures from captured data representative of a user's input gestures, may be evolved based on captured data from a plurality of users. A common set or default set of gesture recognition data may be evolved by selecting a plurality of users for tracking. Captured data of the plurality of users may be processed to identify input gesture data for the plurality of users, and the gesture recognition data may be evolved based on features of the input gesture data that is common to multiple users. The evolved gesture recognition data may be implemented not only for the users tracked, but for users not tracked. An identifier may identify when the evolved gesture recognition data applies and implement the evolved gesture recognition data when the identifier is present.

20 Claims, 9 Drawing Sheets

(56) References Cited

U.S. PATENT DOCUMENTS

| | | |
|---|---|---|
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A * | 10/1996 | Maes et al. ............. 345/421 |
| 5,577,981 A | 11/1996 | Jarvik |
| 5,580,249 A | 12/1996 | Jacobsen et al. |
| 5,594,469 A * | 1/1997 | Freeman et al. ......... 345/158 |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A * | 2/1999 | Hoffberg et al. ............. 700/17 |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,845 A | 5/2000 | Dupouy |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,129,927 B2 * | 10/2006 | Mattsson ............. 345/158 |
| 7,170,492 B2 | 1/2007 | Bell |
| 7,184,048 B2 | 2/2007 | Hunter |
| 7,191,132 B2 * | 3/2007 | Brittan et al. ............. 704/260 |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 * | 8/2007 | Bell ............. 345/156 |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,468,742 B2 * | 12/2008 | Ahn et al. ............. 348/207.99 |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |

(56) References Cited

U.S. PATENT DOCUMENTS

| | | | |
|---|---|---|---|
| 7,843,425 B2* | 11/2010 | Lu et al. | 345/156 |
| 7,852,262 B2 | 12/2010 | Namineni et al. | |
| RE42,256 E | 3/2011 | Edwards | |
| 7,898,522 B2 | 3/2011 | Hildreth et al. | |
| 7,996,793 B2* | 8/2011 | Latta et al. | 715/864 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2002/0064382 A1* | 5/2002 | Hildreth et al. | 396/100 |
| 2003/0048280 A1* | 3/2003 | Russell | 345/619 |
| 2005/0275638 A1* | 12/2005 | Kolmykov-Zotov et al. | 345/179 |
| 2006/0062461 A1* | 3/2006 | Longe et al. | 382/185 |
| 2007/0176906 A1* | 8/2007 | Warren | 345/173 |
| 2007/0283263 A1* | 12/2007 | Zawde et al. | 715/700 |
| 2008/0013793 A1 | 1/2008 | Hillis et al. | |
| 2008/0026838 A1 | 1/2008 | Dunstan et al. | |
| 2008/0158169 A1* | 7/2008 | O'Connor et al. | 345/173 |
| 2008/0284738 A1* | 11/2008 | Hovden et al. | 345/173 |
| 2009/0027337 A1* | 1/2009 | Hildreth | 345/158 |
| 2009/0143141 A1 | 6/2009 | Wells et al. | |
| 2009/0185723 A1* | 7/2009 | Kurtz et al. | 382/118 |
| 2009/0199130 A1 | 8/2009 | Tsern et al. | |
| 2009/0217211 A1* | 8/2009 | Hildreth et al. | 715/863 |
| 2009/0221374 A1* | 9/2009 | Yen et al. | 463/42 |
| 2009/0315740 A1* | 12/2009 | Hildreth et al. | 341/20 |
| 2010/0151946 A1* | 6/2010 | Wilson et al. | 463/36 |
| 2010/0199231 A1* | 8/2010 | Markovic et al. | 715/863 |
| 2010/0281432 A1* | 11/2010 | Geisner et al. | 715/849 |
| 2013/0328763 A1* | 12/2013 | Latta et al. | 345/156 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Visual Instruments for an Interactive Mural—Published Date: 1999 http://hci.stanford.edu/~winograd/papers/instruments/.

Scratch Input: Creating Large, Inexpensive, Unpowered and Mobile Finger Input Surfaces—Published Date: 2008 http://www.chrisharrison.net/projects/scratchinput/ScratchInputHarrison.pdf.

Gestures on Android 1.6—Published Date: Oct. 5, 2009 http://android-developers.blogspot.com/2009/10/gestures-on-android-16.html.

Creating a Library of Gestures with Variants—Retrieved Date: Oct. 7, 2009 http://www-public.it-sudparis.eu/~horain/Publications/GW09-Pez-Pelachaud-Li-Horain.pdf.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, Vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

\* cited by examiner

EVOLVING UNIVERSAL GESTURE SETS

BACKGROUND

Many computing applications such as computer games, multimedia applications, office applications or the like use controls to allow users to manipulate characters or control other aspects of an application. Typically such controls are input using, for example, controllers, remotes, keyboards, mice, or the like. Unfortunately, such controls can be difficult to learn, thus creating a barrier between a user and such applications. Often, such controls may be different than actual actions for which the controls are used. For example, a game control that causes a game character to swing a baseball bat may be a combination of buttons and may not correspond to an actual motion of swinging the baseball bat, or a control to reposition a view on a screen, such as repositioning the view of a map in a map application, may be a selection of arrow buttons on a keyboard and may not correspond to the actual desired repositioning of the map view.

Typically, each computing environment and even computing applications in the same computing environment require unique controllers. For example, a user may interact with a typical television remote control to control aspects of a television and may use a mouse or a keyboard to interact with a personal computer. The many types of controllers and the many varied methods of interacting with each controller may also create a barrier between a user and such systems and/or applications. Not only do the multiple types of controllers require the user to learn multiple methods of inputs for control, but the user may have to learn different controls for different controllers for each computing environment with which the user interacts.

SUMMARY

In a gesture-based system, gestures may control aspects of a computing environment or application, where the gestures may be derived from a user's position or movement in a physical space. Disclosed herein are techniques for evolving a common set of input gestures for interacting with the gesture-based system across the varied components that may make up the gesture-based system.

A common set or subset of input gestures would enable users to interact with the components through different experiences with at least some of the same gestures. Thus, a user does not have to learn the inputs for several unique input devices but, rather, can use gestures within the common set of gestures for control. The system may recognize that a default set of gestures is not effective for certain users interacting with the system. Rather than forcing a set of gesture data to apply that is ineffective, the system may generate an entirely new set of gesture recognition data based on the data captured, modify existing gesture recognition data or generate gesture recognition data that supplements the existing gesture set. The common set of input gestures may be evolved by selecting a plurality of users for tracking. The captured data may be processed to identify input gesture data for the plurality of users, and the gesture recognition data may be evolved based on features of the input gesture data that is common to multiple users. The evolved gesture recognition data may be implemented not only for the users tracked, but for users not tracked. An identifier may identify when the evolved gesture recognition data applies and implement the evolved gesture recognition data when the identifier is present.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION OF ILLUSTRATIVE EMBODIMENTS

Disclosed herein are techniques for evolving gestures in a common set of input gestures. The subject matter of the disclosed embodiments is described with specificity to meet statutory requirements. However, the description itself is not intended to limit the scope of this patent. Rather, the claimed subject matter might also be embodied in other ways, to include elements similar to the ones described in this document in conjunction with other present or future technologies.

Embodiments are related to techniques for evolving common gestures. A gesture may be recognized from captured data representing a user's position or motion in the physical space and may include any user motion, dynamic or static, such as running, moving a finger, or a static pose. According to an example embodiment, a capture device, such as a camera, may capture data, such as image data, that is representative of the user's gesture(s). A computer environment may be used to recognize and analyze the gestures made by the user in the user's three-dimensional physical space such that the user's gestures may be interpreted to control aspects of a system or application space. The computer environment may display user feedback by mapping the user's gesture(s) to an avatar on a screen.

A gesture-based system or application may have default gesture information for determining if a user is performing a particular gesture. For example, a system may have a gesture recognizer that compares captured data to a database of default gesture information such as filters with default gesture parameters. The gesture recognizer may compare data received by the capture device to the default gesture information and output a gesture. The output may include a confidence level that the output gesture was performed.

Gesture sets or gesture data used for gesture recognition, also referred herein as gesture recognition data, may be evolved by selecting a plurality of users for tracking. The captured data of the plurality of users may be processed to identify input gesture data for the plurality of users, and the gesture recognition data may be evolved based on features of the input gesture data that is common to multiple users. The evolved gesture recognition data may be implemented not only for the users tracked, but for users not tracked. An identifier may identify when the evolved gesture recognition data applies and implement the evolved gesture recognition data when the identifier is present.

The system, methods, techniques, and components of evolving gesture recognition data may be embodied in a multi-media console, such as a gaming console, or in any other computing environment in which it is desired to display a visual representation of a target, including, by way of example and without any intended limitation, satellite receivers, set top boxes, arcade games, personal computers (PCs), portable telephones, personal digital assistants (PDAs), and other hand-held devices.

Figure 1:
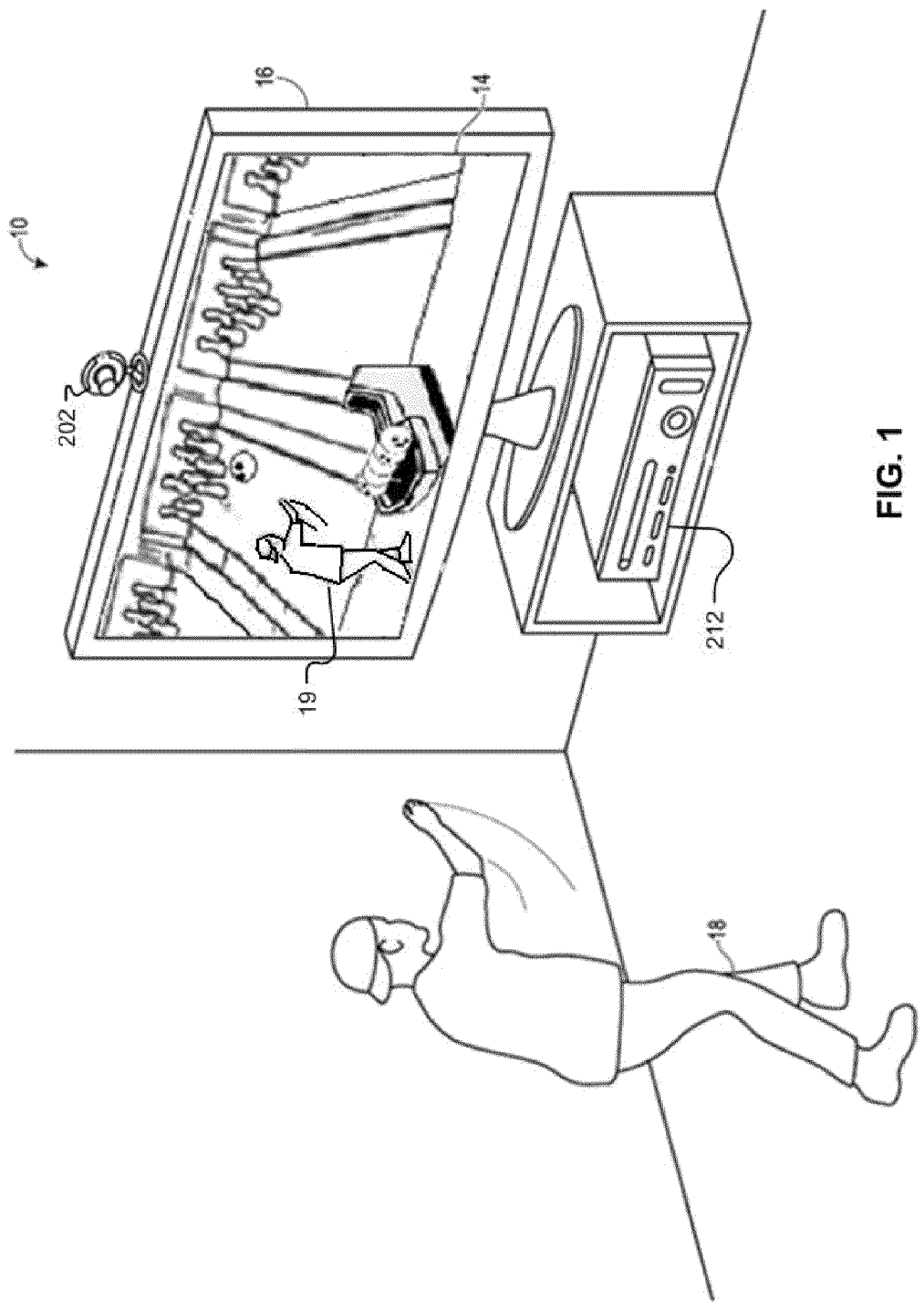
FIG. 1 illustrates an example embodiment of a target recognition, analysis, and tracking system with a user playing a game.

FIG. 1 illustrates an example embodiment of a configuration of a target recognition, analysis, and tracking gesture-based system 10 that may employ the disclosed techniques for gesture personalization and gesture profile roaming. In the example embodiment, a user 18 is playing a bowling game. In an example embodiment, the system 10 may recognize, analyze, and/or track a human target such as the user 18. The system 10 may gather information related to the user's motions, facial expressions, body language, emotions, etc, in the physical space. For example, the system may identify and scan the human target 18. The system 10 may use body posture recognition techniques to identify the body type of the human target 18. The system 10 may identify the body parts of the user 18 and how they move.

As shown in FIG. 1, the target recognition, analysis, and tracking system 10 may include a computing environment 212. The computing environment 212 may be a multimedia console, a personal computer (PC), a cellular device, a gaming system or console, a handheld computing device, a PDA, a music player, a cloud computer, a capture device, or the like. According to an example embodiment, the computing environment 212 may include hardware components and/or software components such that the computing environment 212 may be used to execute applications. An application may be any program that operates or is executed by the computing environment including both gaming and non-gaming applications, such as a word processor, spreadsheet, media player, database application, computer game, video game, chat, forum, community, instant messaging, or the like.

As shown in FIG. 1, the target recognition, analysis, and tracking system 10 may include a capture device 202. The capture device 202 may be, for example, a camera that may be used to visually monitor one or more users, such as the user 18, such that gestures performed by the one or more users may be captured, analyzed, and tracked to perform one or more controls or actions within an application. In the example embodiment shown in FIG. 1, a virtual object is a bowling ball and the user moves in the three-dimensional physical space as if actually handling the bowling ball. The user's gestures in the physical space can control the bowling ball displayed on the screen 14. In example embodiments, the human target such as the user 18 may actually have a physical object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 212 may include a video adapter such as a graphics card and/or an audio adapter such as a sound card that may provide audiovisual signals associated with the game application, non-game application, or the like. The audiovisual device 16 may receive the audiovisual signals from the computing environment 212 and may then output the game or application visuals and/or audio associated with the audiovisual signals to the user 18. According to one embodiment, the audiovisual device 16 may be connected to the computing environment 212 via, for example, an S-Video cable, a coaxial cable, an HDMI cable, a DVI cable, a VGA cable, or the like.

As used herein, a computing environment may refer to a single computing device or to a computing system. The computing environment may include non-computing components. As used herein, a computing system, computing device, computing environment, computer, processor, or other computing component may be used interchangeably. For example, the computing environment may comprise the entire target recognition, analysis, and tracking system 10 shown in FIG. 1. The computing environment may include the audiovisual device 16 and/or the capture device 202. Either or both of the exemplary audiovisual device 16 or capture device 202 may be an entity separate but coupled to the computing environment or may be part of the computing device that processes and displays, for example. Thus, computing environment may be a standalone capture device comprising a processor that can process the captured data.

As shown in FIG. 1, the target recognition, analysis, and tracking system 10 may be used to recognize, analyze, and/or track a human target such as the user 18. For example, the user 18 may be tracked using the capture device 202 such that the gestures of user 18 may be interpreted as controls that may be used to affect the application being executed by computer environment 212. Thus, according to one embodiment, the user 18 may move his or her body to control the application. The system 10 may track the user's body and the motions made by the user's body, including gestures that control aspects of the system, such as the application, operating system, or the like.

The system 10 may translate an input to a capture device 202 into an animation, the input being representative of a user's motion, such that the animation is driven by that input. Thus, the user's motions may map to a visual representation, such as an avatar, such that the user's motions in the physical space are emulated by the avatar. The rate that frames of image data are captured and displayed may determine the level of continuity of the displayed motion of the visual representation.

FIG. 1 depicts an example embodiment of an application executing on the computing environment 212 that may be a bowling game that the user 18 may be playing. In this example, the computing environment 212 may use the audiovisual device 16 to provide a visual representation of a bowling alley and bowling lanes to the user 18. The computing environment 212 may also use the audiovisual device 16 to provide a visual representation of a player avatar 19 that the user 18 may control with his or her movements. The computer environment 212 and the capture device 202 of the target recognition, analysis, and tracking system 10 may be used to recognize and analyze the gestures made by the user 18 in the user's three-dimensional physical space such that the user's gestures may be interpreted to control the player avatar 19 in game space. For example, as shown in FIG. 1, the user 18 may make a bowling motion in a physical space to cause the player avatar 19 to make a bowling motion in the game space. Other movements by the user 18 may also be interpreted as controls or actions, such as controls to walk, select a ball, position the avatar on the bowling lane, swing the ball, etc.

Multiple users can interact with each other from remote locations. The computing environment 212 may use the audiovisual device 16 to provide the visual representation of an avatar that another user may control with his or her movements. For example, the visual representation of another bowler displayed on the audiovisual device 16 may be representative of another user, such as a second user in the physical space with the user, or a networked user in a second physical space. Similarly, an avatar may be displayed in non-gaming applications, such as a word processing or spreadsheet document. Avatars may be displayed that represent respective users that are remote to each other.

Gestures may be used in a video-game-specific context such as the bowling game example shown in FIG. 1. In another game example such as a driving game, various motions of the hands and feet may correspond to steering a vehicle in a direction, shifting gears, accelerating, and breaking. The player's gestures may be interpreted as controls that correspond to actions other than controlling the avatar 19, such as gestures used for input in a general computing context. For instance, various motions of the user's 18 hands or other body parts may to end, pause, or save a game, select a level, view high scores, communicate with a friend, etc.

While FIG. 1 depicts the user in a video-game-specific context, it is contemplated that the target recognition, analysis, and tracking system 10 may interpret target movements for controlling aspects of an operating system and/or application that are outside the realm of games. Virtually any controllable aspect of an operating system and/or application may be controlled by movements of the target such as the user 18. For example, the user's gestures may correspond to common system wide tasks such as navigate up or down in a hierarchical list, open a file, close a file, and save a file. The user's gesture may be controls applicable to an operating system, non-gaming aspects of a game, or a non-gaming application. For example, the user's gestures may be interpreted as object manipulation, such as controlling a user interface. For example, consider a user interface having blades or a tabbed interface lined up vertically left to right, where the selection of each blade or tab opens up the options for various controls within the application or the system. The system may identify the user's hand gesture for movement of a tab, where the user's hand in the physical space is virtually aligned with a tab in the application space. The gesture, including a pause, a grabbing motion, and then a sweep of the hand to the left, may be interpreted as the selection of a tab, and then moving it out of the way to open the next tab.

Figure 2A:
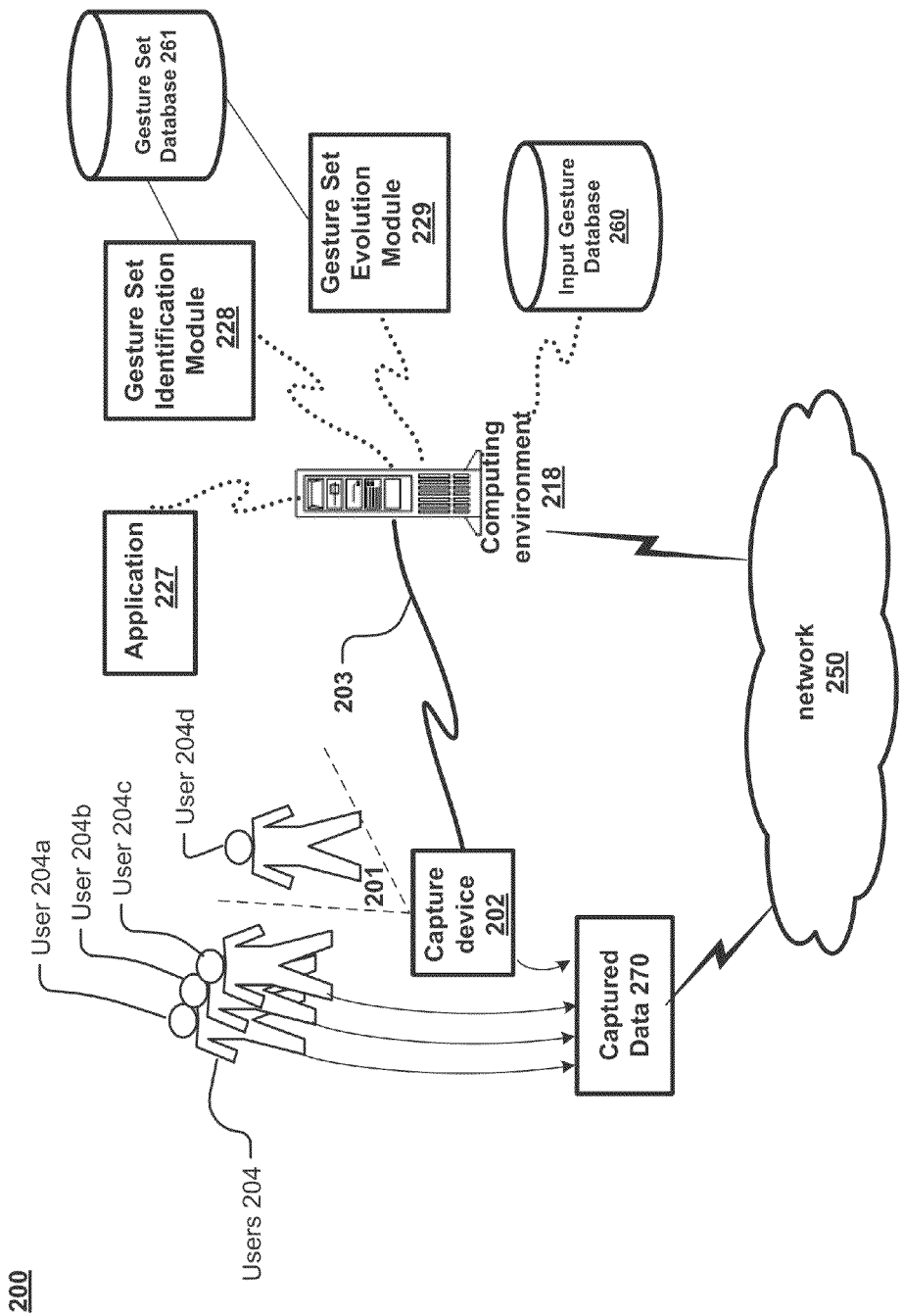
FIG. 2A illustrates an example embodiment of a computing environment in which gesture sets may be evolved based on gesture data of multiple users.

FIG. 2A illustrates an example system 200 that may develop common sets of input gestures and implement techniques for evolving the sets of input gestures. System 200 may include a computing environment 218. As described above, a computing environment may be a multimedia console, a personal computer (PC), a gaming system or console, a handheld computing device, a PDA, a mobile phone, a cloud computer, or the like. For example, the computing environment 218 may be a dedicated video game console, a central server or platform that hosts a plurality of clients, or a personal computing device, such as a cellular telephone or a personal computer. The computing environment 218 may comprise or otherwise be coupled to a capture device for receiving and processing data representative of a user and a user's gestures in a physical space. For example, capture device 202, associated with user 204d, may capture data 270 representative of user 204d in the user's 204d physical space 201. The capture device itself or another computing environment, such as computing environment 218, that receives the captured data may employ gesture recognition techniques to identify gestures from the captured data 270.

The users in this example are users 204a, 204b, 204c, and 204d, collectively users 204, but it is contemplated that any number of users may interact with the gesture-based system 200. For exemplary purposes, users 204a, 204b, and 204c in this example are remote to the computing environment 218, user 204d is local to computing environment 218. One or more capture devices may be respectively associated with each of the users 204 and capture data that is representative of each user in the user's respective physical space, with capture device 202 representing an example of such capture device. The capture device may be a depth camera or a plurality of cameras, for example, that communicates with a single computing environment or with a plurality of computing environments. The captured data 270 represents captured data captured separately for each of the users 204 or an aggregation of captured data captured for any combination of users.

In this example, the computing environment 218 receives and processes captured data 270, either remotely or locally, that represents each of users 204a, 204b, 204c, and 204d for gesture recognition. For example, capture device 202 may provide the captured data 270 to the computing environment 218 via a network 250 or, if the capture device 202 shares a local environment with computing environment 218, via either the network 250 and/or a direct, non-networked connection 203. The captured data 270 associated with remote users 204a, 204b, and 204c may be captured by a remote capture device and provided to the computing environment 218 via the network 250.

As described, the capture device, such as capture device 202, and computing environment 218 may communicate with other system components via a network 250. A network 250 may include, for example, an intranet, an internet, the Internet, a personal area network (PAN), a campus area network (CAN), a local area network (LAN), a wide area network (WAN), a computer network, a gaming network, or the like. The network 250 may also represent the technology that connects individual devices in the network, such as optical fibre, a public switched telephone network (PSTN), a cellular telephone network, a global Telex network, wireless LAN, Ethernet, power line communications, or the like. Computing environments may be connected together by wired or wireless systems, by local networks or widely distributed networks. Any appropriate wireless interface can be utilized for network communications. For example, the wireless link can be in accordance with the following protocols: GSM, CDMA, UMTS, LTE, WIMAX, WIFI, ZIGBEE, or a combination thereof. A network may include cloud or cloud computing. A cloud infrastructure, for example, may include a multitude of services delivered through data centers and built on servers. The services may be accessible anywhere that provides access to the networking infrastructure. The cloud may appear to be a single point of access to the user and the infrastructure may not be visible to a client.

In this example, computing environment 218 is shown executing application 227. An application 227 may be any program that operates or is executed by the computing environment including both gaming and non-gaming applications, such as a word processor, spreadsheet, media player, database application, computer game, video game, chat, forum, community, instant messaging, or the like.

The computing environment may store or otherwise have access to input gesture database 260. The input gesture database 260 may contain an inventory of gesture data, such as a structured collection of records and/or data associated with the gesture data captured or received by the computing environment 218, such as captured data 270 that can be received over the network 250.

The computing environment may comprise modules for processing gesture data. For example, the computing environment 218 may comprise a gesture set identification module 228 and gesture set evolution module 229. The gesture set identification module 228 and gesture set evolution module 229 may analyze or manipulate the gesture data received to identify gesture sets and evolve those sets of input gestures. The modules 228, 229 may access information in the input gesture database 260 for the identification and evolution of the sets of gesture data. The computing environment may store the sets of gesture data and any evolution of the gesture sets in a gesture set database 261. For example, the sets of gesture data may be stored as a structured collection of records and/or data associated with the sets of gesture data identified and/or modified by the input gesture database 260 and the gesture set database 261.

The information in the input gesture database 260 and the gesture set database 261 may be structured to enable a person or program to extract desired information to share information about the user. The input gesture database 260 and the gesture set database 261 may be any form of data storage, including a storage module, device, or memory, for example. The input gesture database 260 may be provided as a database management system, an object-oriented database management system, a relational database management system (e.g. DB2, Access, etc), a file system, or another conventional database package. Further, the databases 260, 261 can be accessed via a Structure Query Language (SQL), or other tools known to one of ordinary skill in the art.

Gesture data may serve as a dictionary that enables the translation of a user's gestures detected by a capture device into an action to be executed by any computing device to control an aspect of the gesture-based system. Packages of standard gesture data may be available to incorporating into the gesture-based system. Enabling packages of standard gestures allows application developers to employ gesture recognition techniques into their applications during development. A gesture database comprising dictionaries of gesture data for analysis of a user's gestures, such as gesture set database 261, may comprise a plurality of gesture data. Where gestures are complementary with each other, the gesture data may be grouped into gesture sets or dictionaries, where the terms set and dictionary are used interchangeably herein to refer to a collection of gesture data. These gesture sets may be provided to applications for use by a gesture recognizer engine. An application may utilize one or more gesture sets.

Thus, a gesture set (or sets) may be provided with an application 227 or come packaged with the computing environment 218, such as a default gesture set. A standardized default gesture set (or sets) may apply universally for all users. For example, a set of gestures may be universally applicable across operating systems and apply system-wide such that a user may perform certain commands via gestures at any time while interacting with the system, despite variations in the system (such as a different application executing on the system).

The gesture-based system 200 may have a gesture set evolution module 229 for developing a gesture set or evolving an existing gesture set based on gesture data compiled during run-time from a collection of users. For example, the gesture set evolution module 229 may recognize that a default set of gestures is not effective for certain users interacting with the system. Rather than forcing a set of gesture data to apply that is ineffective, the system may generate an entirely new set of gesture data based on the data captured, or the gesture set evolution module 229 may modify an existing gesture set or generate a set of data that supplements the existing gesture set.

In an example embodiment, once a universal or default gesture set is deployed as part of an operating system or a gaming system, the system may gather feedback from users to determine the effectiveness of the gesture. The gesture-based system may recognize that a particular gesture(s) is not effective for a group of users.

A gesture may be defined by a plurality of parameters. For example, a gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder, and on the same side of the head as the throwing arm. It may not be necessary to define all bounds of a volume, such as with this throwing gesture, where an outer bound away from the body is left undefined, and the volume extends out indefinitely, or to the edge of scene that is being monitored.

As described in more detail below, a gesture recognizer engine may analyze gesture data, such as information defining a gesture, such as parameters, or metadata, for that gesture. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Where the gesture is a throw, a parameter may be a threshold velocity that the hand has to reach, a distance the hand must travel (either absolute, or relative to the size of the user as a whole), and a confidence rating by the recognizer engine that the gesture occurred. Parameters for a gesture may vary between applications, between contexts of a single application, or within one context of one application over time.

The gesture-based system may recognize a failure of a user to satisfy gesture data, thereby resulting in a failure to issue a control or command to the system via the gesture. The system may recognize the failure actively, such as upon explicit request. For example, the system may request that a user perform a gesture and compare the captured gesture data to the stored gesture data. The system may recognize that the captured data representative of the user's intended gesture does not correspond to the gesture data. The explicit request for the performance by a user of a gesture may be part of a calibration procedure. A calibration procedure may take place upon initialization of the system, an application, or when a new user is identified, for example. The system may request that the user perform a series of gestures. From the captured data, the system can identify the effectiveness of the gestures and how well the user performs each in light of the stored gesture data.

The system may recognize ineffective gesture data by passively tracking the user, where the user may or may not know the system is capturing gesture data for purposes of analyzing of the effectiveness of the stored gesture data. For example, while the user is interacting with the system, the system may track gestures performed by the user for the purpose of analyzing the effectiveness of the gesture data. In an example, the system may expect a particular gesture but fail to recognize the gesture from the user's gesture data. For example, if a user is interacting with a baseball game application or a word processing document, the system may expect a particular gesture based on the circumstances, such as a hitting gesture when the user's player is at bat in the baseball game application or a save gesture when the user closes a word processing document. The system may collect the passively captured gesture data and compare the data to gesture data to determine whether the gesture data is effective.

A complete failure to satisfy the gesture data or a variation between the user's gestures and the gesture data, such as gesture parameters set in the filter for the gesture, may indicate an ineffectiveness of the stored gesture data. The result may be a complete failure in the user's gesture to register with the stored gesture data or it may result in a variation that is outside an acceptable tolerance. For example, variations between the data representative of the measured gesture and filter parameters for a gesture(s) may indicate a failure in the execution of the measured gesture. The variation can be compared to a threshold level of acceptance, where a variance amount that is below the threshold is outside the acceptable tolerance.

The system may identify the circumstances of the scenario in which the failure or unacceptable variation occurred based on one or more identifiers recognizable to the system. As described herein, the identifier may be any feature of the scenario that is identifiable by the system (e.g., the operating system, current user(s), application executing, a location, etc). For example, the system may identify a location via GPS or via an IP address, where a location may be an identifier. The system may identify a user may by capturing data representative of the user and employing body/facial recognition techniques, where a particular user or detected features of a user may be an identifier. The system may identify the operating system or an application loaded by an analysis of the hardware/software configuration, such as by identifying the serial numbers of components labeled during installation, where an operating system or an application may be an identifier. The system may track users and identify a user or group of users, and associate an identifier (e.g., geographically, demographically, linguistically, culturally, etc.) with the compiled gesture data. The identifier may correspond to the basis for the needed updates. For example, a particular cultural context may be the reason why a certain gesture fails for a group of users (e.g., a gesture for powering the system off that comprises a waving gesture, where a waving gesture may be a derogatory motion within a particular cultural context). The common feature of the users to which an evolved gesture set may apply, that does not use a waving gesture, may be a particular culture—the cause of the need for evolving the gesture data.

While the above examples provide specific examples for an identifier, it is noted that the identifier may be any system-identifiable feature of the scenario. For example, the identifier may be at least one of an operating system, an application, a user, a feature of a user, a location, a type of application, a hardware configuration, a software configuration, a culture, current user, geography, demography, linguistic, culture, or a style. The system may correlate a scenario to the identifier by analyzing captured data (e.g., identifying a user from the captured data or identifying a culture based on a user's gestures), or via other inputs by a user or a component in the system (e.g., the user may indicate a location by selecting a location from a menu, or the system may provide details of an existing hardware configuration, a location device may provide a location, etc). Upon recognition of the identifier, the system may select the gesture set that is associated with the identifier and implement the gesture set for gesture recognition.

The system may monitor the ease or difficulty with which a user performs particular gestures and determine whether the universal gesture set, associated with the identifier, should be updated for one or more users based on the identifier. Thus, the gesture set evolution module 229 may update sets of gesture data based on the gesture data compiled from users.

The system may use the failure or unacceptable variation detected as a trigger to compile data for a potential update or modification of the gesture data. As described above, the gesture-based system may track users passively or actively. For example, the gesture-based system may compile gesture data from a test group of users, such as by soliciting feedback from volunteers or passively tracking users of the system. In an example embodiment, the system can ask for help from its user base. For example, when a particular gesture is determined to be ineffective for a subset of users (e.g., a particular demographic), one or more users in this subset could be asked to perform a gesture to accomplish a particular task (e.g., shown a particular before and after picture, and asked to perform the gesture that would cause that change).

In order to determine whether the universal gesture set should be evolved to include updates detected in the compiled gesture data, tests may be conducted on the test group to determine whether performance improves. For example, test users may be requested to perform a particular gesture and the system can compare the captured gesture data to the gesture data as it would be evolved. These test users may be paid some form of compensation (e.g., paid cash or as part of an employment agreement), recognized for their contribution, they may be volunteers, or they may be tracked without being aware. If the system determines that a new or different gesture is more effective for performing the particular action, the system may evolve the universal gesture set to include the updates and associate the gesture set with an identifier.

As described herein, the identifier may be based on a common feature of the test group and may indicate applicability. For example, during the identification of ineffective gesture data, a first identifier may be associated with the gesture data identified as ineffective. However, as the evolution of the gesture data is tested among various users, a second identifier may be associated with the gesture data, either to replace the first identifier or in addition to the first identifier. For example, the second identifier may identify whether the gesture set is applicable for all users, for all users sharing one or more characteristics with the test users, for users that do not share a particular characteristic with test users, characteristics of the operating system or application with which the user is interacting, or the like. Updates to gesture data may be tested on a different subset of users and, if the gesture is more effective for the different subset, the universal gesture set for the subset of users could be updated and the same or a different identifier associated with the different subset of users.

A generated or evolved set of gestures may comprise a set of universal gestures that are generated or evolved based on gesture data compiled from any number of users. An identifier may be associated with the gesture set, where the identifier is indicative of a feature of the users from which the data for the generation or evolution is compiled. An identifier may be based on a common feature of the scenario in which the newly developed or evolved set of gesture data is derived, such as a feature shared among the users of the system that are tracked for the generation or evolution of the gesture data. For example, an identifier may be a feature of the users from which the gesture data was compiled, such as a location common to the users or a skill level/range common to the users. The system may recognize that, within the subset, a subset within the subset perform the gestures in a certain manner. The system may identify a common feature, or identifier, between the subset of the subset. The system may identify a larger test group based on the identifier and continue to compile data to analysis for increased confidence in the possible update to the gesture data. Thus, the test groups may be changed and varied over time based on the gesture data, further categorizing the test groups based on the many possible identifiers.

The identifier identified during evolution of the gesture set assists to identify the applicability of the evolved or generated gesture set. For example, a default gesture set that is pre-packaged with the gesture-based system, that may be applicable for all users, may be modified based on a compilation of gesture data from a plurality of users, thereby generating a new gesture set. If at least one gesture in a gesture set is ineffective for a plurality of users sharing a common feature (e.g., location, application, skill/level, body type, etc) an identifier may be associated with the gesture set based on the common feature. The evolved gesture set that modifies the default gesture set may be associated with the identifier.

Multiple gesture sets may be generated or evolved, and the gesture sets may be generated or evolved based on data from any number of users. A gesture set that applies universally to a first individual or group may be different than the gesture set that applies universally to a second individual or group. For example, a first group may be in a particular region and a gesture set that has evolved to reflect the manner in which users in the particular region gesture. The second group may be a defined by access to a particular application, where a gesture set associated with the application has evolved based on gesture data from a collection of users while the application was executing. Thus, the implementation of the gesture set may be triggered upon recognition of the identifier that is associated with each gesture set.

The generated or evolved set of gestures may apply to a specific set of users, where the identifier is associated with those specific users. Alternately, the set of gestures may be generated or evolved based on a subset of users but may be applicable for a larger set that are associated with the identifier (e.g., region or location, similar types of users, a similar application executing, etc). Thus, a gesture set may be generated or evolved for a user even if the user is not a part of the test group. For example, the set of gestures may be generated and developed based on gesture data compiled from a group of users, such as the volunteers described above, but the group of users tracked for compiling gesture data may only be a subset of users that are associated with the identifier of the gesture set. For example, the gesture-based system may compile gesture data from a plurality of users in a region, where the plurality of users are a subset of the number of users in that region. However, the identifier may correlate the gesture set to that region, and thus, the gesture set may be identified for implementation for any user in the region (where the users in the region share the same region identifier).

As gesture set is evolved, the system may compare features of the scenario for a plurality of users and the identifier may be a circumstance of the environment, such as the operating system or an application or type of application, for example. Thus, the identifier may be related to other circumstances of the gesture based system, such as the type of operating system or type of application executing during compilation of the gesture data. For example, a set of gestures may function across varying operating systems and/or applications, the identifier may assist in determining under which circumstances a particular gesture set applies. The identifier, for example, may associate a gesture set with a specific category of applications. For example, a gesture set applicable for productivity type applications may be universally applied for productivity scenarios, while another gesture set applicable for game applications may be universally applied for the game applications. Thus, each of the sets of gesture data may apply universally within respective contexts. Further, a set of gestures may be applicable based on one or any combination of identifiers. Or example, a gesture set may be generated for a certain type of user executing a certain type of application, such as a user in a particular region gesturing to control a game application.

The identifier for a particular group of users for which data is compiled and used for evolving a default gesture set may be a specific demographic of the user, such as the user's country. The gesture-based system may identify the country based on an identity of the location of the system or the user. For example, the gesture-based system may be programmed with location-based system software that can utilize location-based services (e.g., GPS) to determine the location of the components. In another example embodiment, the system identifies an I.P address associated with the user's computing environment and uses the IP address to determine the location of the user. In another example, the user may select a country and the gesture-based system may store the user's selection in memory.

In another example embodiment, the identifier relates to a style of a user, such as a style classifier. For example, the system can classify styles of gestures (maybe some users are very precise, some are sloppy, some use more hand, some use less body, etc), and the system could compile data that correlates to the particular style, noticing that they fit one of the styles more closely than the default. It is likely that at least a subset of users within the users of the system will benefit from a gesture set evolved based on a compilation of users with a similar style. The style may be applicable to such things as a user's handwriting for generating or evolving gestures based on the handwriting of a plurality of users.

A plurality of gesture sets may be generated and/or modified based on the standardized gesture set provided by the system. Gesture data may vary between gesture sets and gestures sets may be associated with a particular context, identified via the identifier. For example, a first gesture set may be applicable in a first context, and second gesture set may be applicable in a second context. The default gesture set or sets that may come pre-packaged with the system or application, for example, may apply universally within a particular context. For example, a set of gestures for a particular operating system may comprise gesture information for commands such as opening a file, selecting a file, moving between applications, confirming an action, deleting a file, opening an application, etc, and the set of gestures may apply universally to all applications that execute on the operating system.

The identifier may simply be an identifier that identifies universal application of the evolved gesture set. Thus, the evolved gesture data may not be applied to a specific group of users based on an identifier, but rather replace the original default gesture set for any user of the system.

Following the association of an evolved gesture set to an identifier, the gesture identification module 228 may use the identifier to associate a gesture set to a user by identifying and implementing the appropriate gesture set(s) for an improved experience for the user. The generated or evolved gesture set may still be universally applicable to a plurality of devices, users. For example, a gesture set may be evolved based on features of the user (e.g., location) but apply universally for the operating systems and applications accessed by such users.

Consider a visitor of a foreign country. While visiting, the user may wish to interact with the gesture-based system. However, rather than the system having to reprogram or learn the user's different method of gesturing, the system may implement a set of gestures based on a country selected by and associated with the user. Thus, the user's interaction with the system may be much different from a colleague or other participant standing next to the user, but each user may have similar control with their respective gestures recognized by the gesture-based system.

Figure 2B:
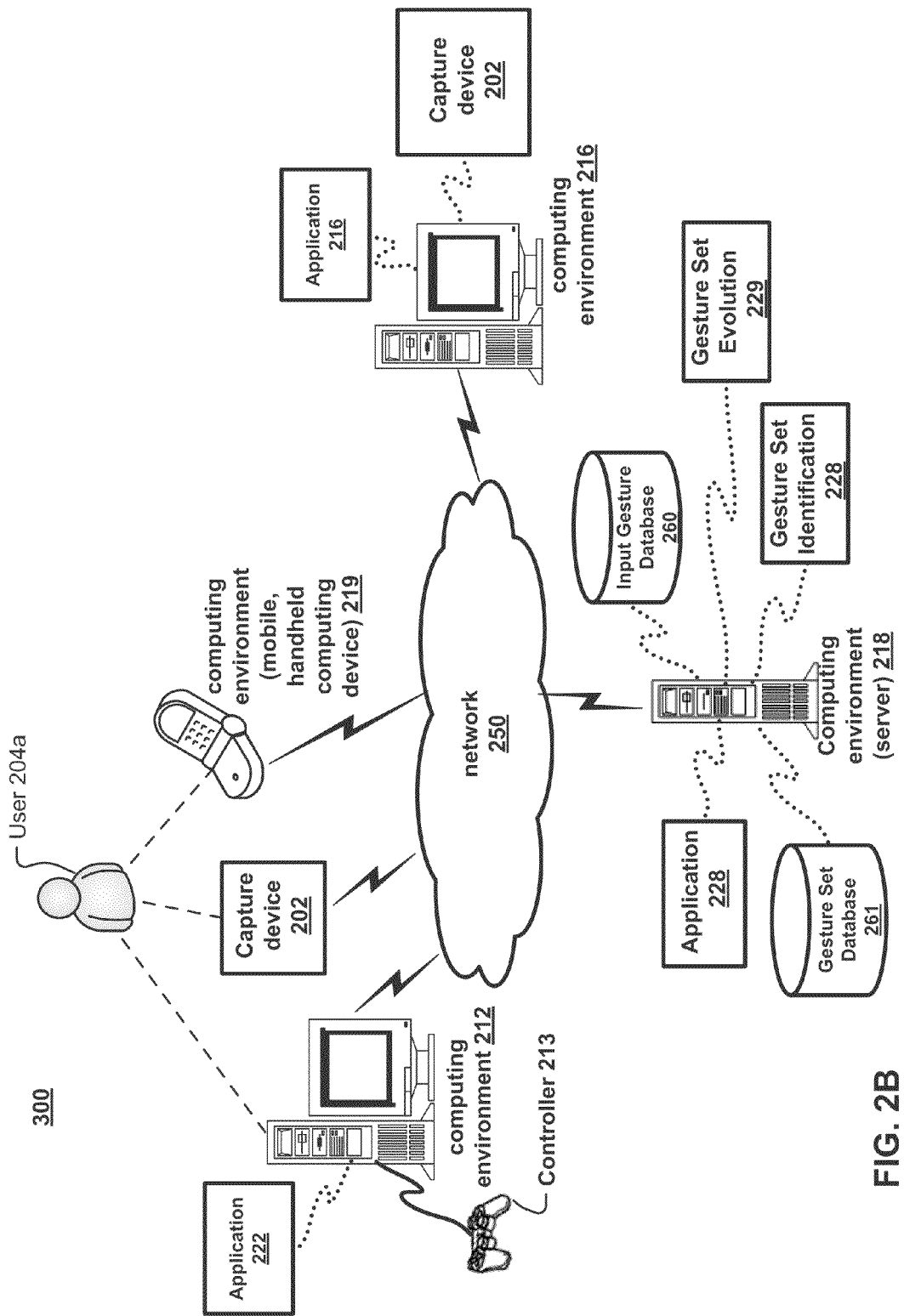
FIG. 2B is a diagram for aggregating gesture data from multiple users in a network.

FIG. 2B depicts a gesture-based system comprising an exemplary combination of components that may interact to share gesture data. By connecting devices in a network or cloud, the gesture-based system can collect gesture data from a plurality of users, remote or local, and associate various identifiers depending on the features of each user and/or each user's respective computing environment. For example, the gesture-based system may recognize from a compilation of user gesture data that, within a certain region (e.g., country, county, state), there is a high failure rate for a particular gesture or a higher failure rate than what is achieved in different regions.

FIG. 2B illustrates an example system 300 in which common sets of input gestures may be developed and that can implement techniques for evolving the sets of input gestures. System 200 may include a computing environment 212, 216, 218, 219, and capture devices 202, 203. In this example, computing environment 212 is shown executing application 222, computing environment 218 is shown executing application 228, and computing environment 216 is shown executing application 217. The user 204 is shown locally associated with computing environment 212, capture device 202, computing environment 219 (shown as a mobile, handheld computing device). A computing environment may be a multimedia console, a personal computer (PC), a gaming system or console, a handheld computing device, a PDA, a mobile phone, a cloud computer, or the like. For example, each computing device 212, 216, 218, 219 may be a dedicated video game console or a more general computing device, such as a cellular telephone or a personal computer. Computing environment 218 is shown as a server and computing environment 219 is shown as a mobile handheld computing device. Computing environment 218 is shown storing, executing, or otherwise having access to the input gesture database 260, gesture set database 261, gesture set identification module 228, and gesture set evolution module 229 as described with respect to FIG. 2A.

As used herein, reference to a system may be a reference to any single part of the system 200 shown in FIG. 2, any combination thereof, or any additional component or computing environment that can perform a similar function. For example, the computing environment 212 may provide the functionality described with respect to the computing device 212 shown in FIG. 1 or the computer described below with respect to FIG. 8. It is contemplated that any one of the computing environments 212, 216, 218, 219 may be configured as a target recognition, analysis, and tracking system such as the 10 target recognition, analysis, and tracking system shown in FIG. 1, and any one of the computing environments may employ techniques for gesture personalization and gesture profile roaming. As shown in FIG. 2, the computing environment 212 may include a display device and a processor. The computing environment 212 may comprise its own camera component or may be coupled to a device having a camera component, such as capture device 202. For example, computing environment 212 may be coupled to or otherwise receive gesture information for user 204 from the capture device 202 that can capture data from the physical space.

In these examples, a capture device 202 can capture a scene in a physical space in which a user is present. The user 204 is within capture view of the capture device 202 that can capture data representative of the user's gestures. The capture device 202 can provide the data to any computer environment for processing or may have a processor itself for analyzing the data. For example, a depth camera 202 can process depth information and/or provide the depth information to a computer, such as a local computing environment 212. The computing environment 212 may analyze the captured data to identify the user's gestures and map the user's gestures to the display. For example, the depth information can be interpreted for display of a visual representation of the user 204. The capture device 202 may provide the data over a network 250 for analysis by a remote computing environment, such as computing environment 218 or 219. Thus, a computing environment remote to the user may process data captured by a capture device local to the user 204 and display a visual representation of the user at the remote computing environment.

In another example embodiment, the mobile, handheld computing device 219 may be coupled to the capture device 202. The handheld computing device 219 may itself have data capture and gesture recognition capabilities. For example, the handheld computing device 219 may have a capture device that is a component of the handheld computing device 219 or otherwise coupled to the handheld computing device 219 to share image data. The handheld computing device 219 may process the image data and generate a gesture profile with gesture information specific to the user. The mobile handheld computing device 219 can process the data and/or provide the data to another computing environment. The handheld computing device 219 may store the generated gesture profile.

System and application developers may incorporate packages of standard gestures into their systems and/or applications for gesture recognition. The packages may be pre-packaged with the application or computing environment, for example, as a default set of gestures. Gestures may be universal, system-wide, application-specific, user-specific, environment-specific, etc. In this example embodiment, the user is interacting with computing environment 212 that is executing application 222. Gesture information may comprise both gestures that control aspects of the computing environment 212 and/or the executing application 222.

In this example, the computing environment 218 is a server that serves several clients, including computing environments 212, 219, and 216. As described above, the gesture set identification module 228 may indicate the identifier and collect data for users associated with the identifier. As described above, the data may be collected for all users or a subset of users. Thus, the gesture set identification module 228 may compile gesture data from other users within the region. The gesture set evolution module 229 can evolve the gesture sets based on the gesture data compiled from a plurality of users, such as users 204a and 204b. Users 204a and 204b may be local or remote with respect to each other as well as the server 218.

The gesture-based system can compile data and store gesture data, such as in input gesture database 260. The gesture-based system may continuously compile input gesture data from the plurality of users and identifiers associated with the input gesture data to identify trends or commonalities between the gesture data and the effectiveness of the gesture data, such as the failures and/or success of the users. Using the input gesture data, the gesture-based system can begin to identify ineffective gesture data for users, such as for users in a particular region or a particular type of person. For example, the gesture-based system may detect discrepancies between the gesture data and the manner in which users within a particular culture perform the gesture. The system can customize the gestures for different cultures.

The system may identify ineffective gesture data and actively or passively generate a new set or evolve an existing set via the gesture set evolution module 229, as described above, and store the results in the gesture set database 261. A user may proactively select to initiate gesture data evolution. For example, a developer, a leader of a scene, or any user of the system may identify ineffective gesture data and initiate a calibration process or experimentation phase. In another example, the gesture-based system may select users to monitor and compile information whether or not the user is aware. The system may determine that a plurality of users perform a gesture in a certain manner that is varied from the default gesture data. The system may modify the gesture data to correspond to the manner in which the plurality of users perform the gesture, and identify common features between the users to serve as an identifier for the gesture set.

The gesture-based system may distribute, launch, or introduce the newly generated gesture set or the evolution of the default gesture set to other environments. For example, the server 218 may store the generated or evolved gesture sets on a storage medium coupled to or otherwise connected to the server 218, such as the gesture set database 261 that may be stored on the server 218, for example. The server may distribute the updated gesture sets to clients, such as computing environments 212, 216, or 219. The gesture sets may be introduced to all clients networked to the server. Each computing environment may have its own gesture set identification module that can identify the gesture sets applicable to the scenario that exists locally. In another example, the server's gesture set identification module 228 may identify the identifier associated with a gesture set and determine which users (i.e., which computing environments associated with respective users) should receive the distribution of the generated or evolved gesture set.

The techniques of gesture set generation/evolution provide a way to personalize a particular user's gestures based on data collected for other users. The gesture sets may comprise gesture data that comprises various inputs, such as touch, voice, etc. A certain type of user may be more likely to use touch inputs for certain gestures. However, a user with different identifying characteristics may be more likely to use arm motions for the same gestures. For example, a child may tend to use more active inputs, while an adult may tend to use more conservative motions or be accustomed to a different type of gesture that comprises touch or voice. The system may recognize voice and speech patterns that are varied from a default set of gesture data and the gesture sets may be evolved to correlate to the voice and speech patterns of a test group. For example, a system may detect an accent and modify the speech patterns that are used in conjunction with a gesture.

The disclosed techniques of identifying common gesture sets and continuing to evolve those gesture sets address the limitations of a controller that constrains or limits a user's inputs into the system. For example, as new applications are brought to a platform, or new users adopt a platform, the evolving gesture sets may be adapted to the particular application or the users. As updates are made to the universal gesture set, these updates may be made silently (e.g., the user is not notified that a change is made), with notification (e.g., the user is notified that the gesture for function X is now Y), be provided with an opt-in opportunity (e.g., "would you like to update the gesture for function X to gesture Y"), or by other process.

As new users adopt platforms that support gesture-based controls, default gesture sets that are not intuitive may be made intuitive via the techniques disclosed herein. For example, there may be a gesture that means "OK" or "go" in the default gesture set, despite the fact that this gesture means "Stop" in a certain culture. Consider the scenario when a new application is released. Users may have difficulty performing certain gestures. The system can experiment with test users on alternative gestures to find a more effective solution. The system can detect that the default gesture is not effective and experiment with test users on alternative gestures to find a more effective solution. When a more effective solution is determined, it can be distributed to a population of users (i.e., from a host server to a local computing environment) larger than the population of test users.

Referring to FIG. 2A, while the captured data 270 for remote users 204a, 204b, and 204c is provided remotely in this example to the computing environment 218 for processing, it is contemplated that a respective computing environment that processes captured data may be associated locally with each of the users 204 and/or share a local environment with a capture device that captures data representative of each user. A gesture-based system may function entirely as a unit local to a user, where a local capture device captures data representative of the user and the local computing environment processes and recognizes gestures from the capture device for controlling aspects of the system. However, the local computing environment may provided the captured data and/or processed data to a remote component of the gesture-based system. Any of the users 204 may be remote to a computing environment that receives and/or processes the captured/processed data that represents the user or the user's gestures. It is noted that more than one user may occupy the same physical space, and a computing environment and/or capture device may be locally associated with more than one user.

The gesture set evolution module 229 and gesture set identification module 228 are units representative of hardware, software, or a combination thereof that may reside on the computing environment 218 or another part of the gesture-based system and perform the embodiments described herein. The gesture set identification module 228 and gesture set evolution module 229 are described in this specification as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It is noted that the common input gesture sets are developed and evolved by a server 218 in the example in FIG. 2B, but it could be done by any computing environment that incorporates gesture-based controls. For example, the computing environment 212 in FIG. 2B may aggregate data from local users of the system and evolve the locally stored gesture sets. The computing environment 212 may collect data over the network from other systems, such as from computing environment 219 or 216, and make intelligent decisions regarding which inputs from remote users are applicable to the local users of the system. For example, input gesture data from other children in a certain age range that interact with remote systems may be used to modify a local input set if the local user is within that age range. The computing environment may store the information for local use, or may upload or otherwise provide the information over the network 250 to other networked components. Thus, a computing environment that evolves gesture sets based on local users may upload or otherwise provide the evolved gesture set data to a other networked computing environments, such as a host environment or a remote computer environment that is sharing resources (e.g., executing an application across both environments such that remote users may interact with each other via their respective local computing environments).

As described above, the gesture set evolution module 229 may be located on an end user computing environment or a host environment. Thus, the evolution of the gesture sets or data that modifies a universally provided gesture set may be performed or stored locally or remotely from the computing environment associated locally with the user. If performed locally, a local gesture set evolution module 229 may recognize updates to gesture data that are more effective for the users that interact directly with the local computing environment 218. Thus, the users that interact locally with the computing environment may benefit by an evolution of the gesture sets based on the users that interact directly with the computing environment. For a residence, for example, the gesture sets may be evolved to reflect the gestures as they are performed by a family that shares similar characteristics. The local users are obviously in the same region or location, but there may be further characteristics that users that interact directly with each other share. For example, members of a family may make gestures in a similar fashion simply as a result of having similar physical characteristics or interacting in a certain personal manner.

The gesture data may correspond to various controls, such as select file, open file, close file, power off, load an application, etc. For each gesture, the system may start with a generic description of the gesture properties. As described in more detail below with respect to the gesture recognition architecture, gesture information can include any identifiable parameter(s) of the user's gesture, including ranges, speeds, accelerations, velocities, etc. For example, a gesture may be represented by a trajectory of points of the user's body. As the user moves, a trajectory representing a sequence of points of the user's body may be tracked between captured images. If the trajectory resembles the trajectory defined for the gesture, or falls within an acceptable range for the trajectory defined for the gesture, the system may return an identity of that gesture. For example, a baseball throwing gesture or a portion thereof may have as a parameter a volume of space in which it must occur. This volume of space may typically be expressed in relation to the body where a gesture comprises body movement. For instance, a baseball throwing gesture for a right-handed user may be recognized only in the volume of space no lower than the right shoulder, and on the same side of the head as the throwing arm.

The system may evolve the default aspects of gesture data itself or identify other characteristics that correspond to the gesture. For example, the system can identify tendencies in a user's facial expressions, body positions, language, speech patterns, skeletal movements, words spoken, history data, voice recognition information, etc, that correlate to the user's gesture, and indicate the correlation in the gesture profile, for example. In the future, when the user performs the gesture, if the additional aspects or characteristics are also detected, the system may supplement the gesture data compiled and analyzed by the gesture set evolution module 229.

A gesture-based system, whether providing gesture-based services to local users or to a plurality of local and/or remote users, may compile gesture data. For example, a local system may compile personalized gesture information from each of the local users that access the system. A more broadly available gesture-based system, such as a server on a network that services a plurality of remote users, may compile personalized gesture information from a multitude of remote users. By aggregating gesture data from a plurality of users, the system may combine information for modifying the default gesture data. For example, a gaming network may compile information from various computing environments and use the data for the development of modifications to the gesture data that are distributed to a plurality of computing environments. For existing users, the network may update the pre-packaged data for existing applications and perform an update to systems on the network to implement the updated pre-packaged gesture data. Thus, both new users, current users, new applications, and current applications may benefit from the analysis of aggregated personalized gesture data.

The system may intelligently update the default or pre-packaged gesture data such that it corresponds better to the more prevalent manner in which a set of users serviced by the system perform particular gestures. For example, the system may modify pre-packaged gesture data to correspond to tendencies identified in an aggregation of the personalized gesture data for the plurality of users. The modification may be made for a particular program or a particular control of the gesture-based system. The system may modify the gesture for users of a local system or for users in a particular region that perform gestures in a similar manner that deviates from the default gesture data provided by the system. For example, as described below, a context may apply for a particular region or even for a set of users within a single household.

The gesture data, such as the default gesture sets or evolved gesture sets, may be locally or remotely stored on a media, e.g., a removable or non-removable media, on a computing environment, e.g., computing environment 212, 216, 218, 219. The media can be removable storage and/or non-removable storage including, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information. The storage media may be implemented in any method or technology for storage of information such as computer readable instructions, data structures, program modules, or other data.

The computing environments on the same network can share files and access files and settings local to another computing environment, such as the captured gesture data. The gesture data on a local machine may be accessed from a remote computing environment in various manners. For example, gesture data may be streamed over a network, such as the Internet. A web browser may be viewable on the local computing environment 212, and the user may browse the Internet via the input/output component. The user may select or "click on" a gesture file that is accessible from a server 218 to download or stream to the user's local machine, such as computing device 212. The gesture data may be stored by the local computing environment as a copy or back-up version of the gesture profile that is accessible via the network. In some instances, a temporary gesture set may be cached or otherwise stored temporarily on a local machine. The information in the temporary gesture set may be used to refresh or add to a gesture set stored elsewhere, such as by uploading the gesture data to a central gesture database 261 via the network 250.

The network 250 may be any network arranged so that messages may be passed from one part of the network to another over any number of links or nodes. It is contemplated that any number of links or nodes may exist on the network, and any number of networks may be connected by at least one link or node from another network. For example, the computing environments 212, 216, 218, 219 may each be a node on the network 250. Each computing environment 212, 216, 218, 219 may execute applications but can also access other nodes (e.g., other computing environments) and applications executing on or devices connected to other nodes, anywhere on the network 250. Thus, a user of a local computing environment may use the network to share data (e.g., files, databases), interact with other applications, share devices (e.g., printers), communicate with other users (e.g., email, chat), etc. For example, a user 204 of computing environment 212 may access an application executing on the computing environment 216 via the user's local computing environment 212 via the network 250. Any number of users associated with any number of respective local computing environments may access the same application via the network 250.

A computing environment 212, 216, 218, 219 may be configured to recognize gestures and process, store, distribute, upload, download, update, or the like, gesture information. A gesture set may be generated and/or evolved by any computing environment that is local or remote to the user. The network topology enables any computing environment that has access to the network to access the gesture set from another computing environment. For example, a gesture set generated locally by computing environment 212 may be uploaded to a remote server 218. The user 204 may move to a different location, or use a different computing environment in the same location, and download the gesture set to a computing environment at the different location, or to the different computing environment in the same location. For example, user 204 may go to a friend's house where the local computing environment is computing environment 216. If the gesture set is stored locally on computing environment 212, the computing environment 216 may communicate with computing environment 212 via network 250 and request the gesture set.

In an example embodiment, the network 250 comprises an Xbox LIVE network accessible via a broadband connection maintained by server 218. Computing device 212, local to the user 204, and computing environment 216, remote to user 204, could be Xbox game consoles that can execute the same game from the server 218. The Xbox game consoles 212, 216 may be executing an application locally or via a remote computer connection. Game console 212, local to the user 204, may have a capture device and capture image data representative of the user's gestures. The game console 212 may be coupled to the capture device 202 and process the image data to recognize the user's gestures made in the physical space. Computing environment 212 may use captured gesture data from a plurality of users to generate or evolve a default gesture set and store it locally thereon. The computing environment 212 may upload or otherwise transmit the information over network 250 to the Xbox LIVE server 218. The Xbox LIVE server may maintain a gesture database 261 for users that have access to the Xbox LIVE service.

In another example embodiment, the network 250 comprises an Internet connection to a server 218 that is providing a movie service. Computing environment 212 could be a DVD player, computing device 219 could be a handheld computing device, and computing environment 216 could be a PC that connects to the Internet via an Ethernet cable or Wi-Fi, for example. Thus, all three computing environments 212, 216, 219 could connect to the server 218 to access, stream, download, select, etc, movies. A gesture set may be generated or evolved by any of the three computing environments 212, 216, 219 that process image data representative of a plurality of users' gestures in the physical space. The generated or evolved gesture sets may be stored locally on the computing environment that generated the profile, or it may be stored remotely, such as by the server 218 that provides the movie service. Similarly, the service may have a gesture database 261 for storing gesture sets for the user's that have access (e.g., a subscription, freeware access, etc) to the service.

Figure 6:
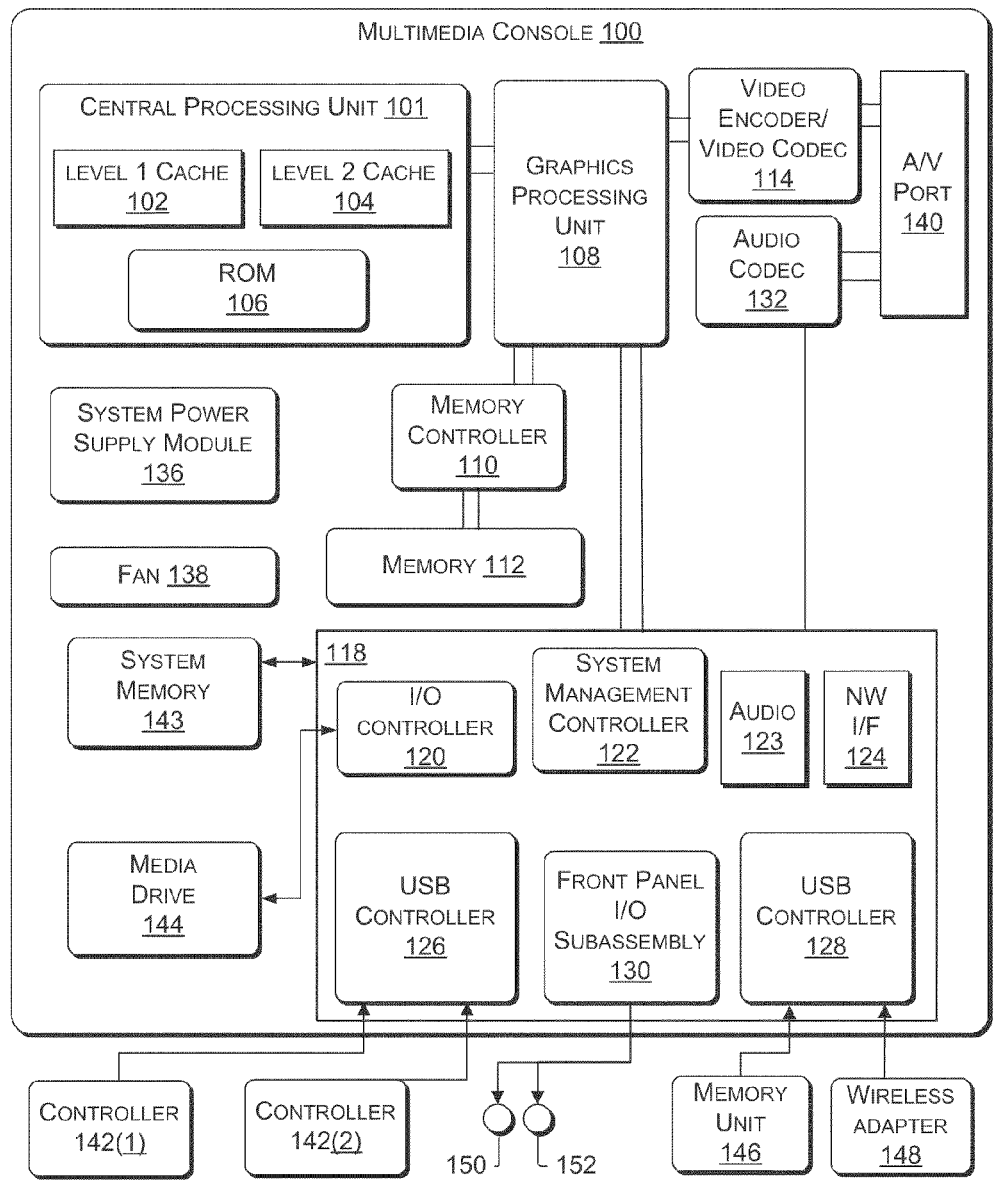
FIG. 6 illustrates an example embodiment of a computing environment in which the techniques described herein may be embodied.

There are a variety of systems, components, and network configurations that support networked computing environments. A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process uses the requested service without having to "know" any working details about the other program or the service itself. In a client/server architecture, particularly a networked system, a client is usually a computer that accesses shared network resources provided by another computer, e.g., a server. In the example of FIG. 6, any computing environment 212, 216, 218, 219 can be considered a client, a server, or both, depending on the circumstances.

In FIG. 2B, the network is shown having a connection to server 218. Server 218 may be a computing environment comprising any combination of hardware or software and/or running an operating system that is designed to provide a service. A server 218 is typically, though not necessarily, a remote computer system accessible over a remote or local network 250, such as the Internet. The server may be the host for multi-user, multi-computing environments, providing services to clients on the network 250. The client process may be active in a first computer system, such as computing environment 212, and the server process may be active in a second computer system, such as server 218.

The computing environments 212, 218 may communicate with one another over a communications medium, such as the network 250, thus providing distributed functionality and allowing multiple clients to take advantage of the information-gathering capabilities of the server. Any software objects may be distributed across multiple computing devices or objects. Computing environments 212, 216, 218, 219 may share gesture data via the network 250. Thus, any computing environment may generate and/or store a user's gesture profile. Any other computing environment that can communicate over the network 250 may have access to the gesture profile.

It is noted that gestures may include dynamic or static movement as well as voice commands, and may be performed to control aspects of the system or an executing application. A gesture may also comprise input derived from the combination of user position or movement captured by a capture device (herein "user position data" or "position data") in conjunction with input derived from another source, such as the press of a button on a controller, or the position of an object in a scene in which the user is captured (herein "additional data"). The system may receive controller input from a wired or wireless controller 213. The user may supplement the motions or poses that he makes with his body that are captured by capture device 202 with input via the buttons, joysticks or other pads of controller 213. For instance, while playing a first-person shooter game, user 204 may point with his arm at a location displayed by the computing environment 212. He may further press a button on controller 213 at substantially the same time. Computing device 212 may recognize the user pointing while pressing a button as a "discharge firearm" gesture.

Thus, a computing environment may not only include a gesture interface but may process instructions configured to use tactile based (input relying on touch) user input. For example, application 222 may comprise such instructions, where application 222 may be any type of program such as operating system, word processor, video game, etc. In an embodiment where application 222 is an operating system, the operating system can include input output drivers such as mouse drivers, keyboard drivers, a capture device driver, and other I/O drivers such as, for example, touch screen drivers, microphone drivers, video game controller drivers, or any other human interface device drivers. In an embodiment where application 222 is an application such as a web-browser, a word processor, a picture editing program, etc, application 222 can include executable instructions that request one or more threads to handle and process user input. In this example, application 222 may rely on mouse drivers, keyboard drivers, and other I/O drivers installed on the operating system and OS code to supply it with user interface messages.

A computing environment 212, 216, 218, 219 may process image data and identify variations in the user's gestures from the default gesture data provided with the application. The system may perform personalization by explicitly requesting the user to perform a gesture and capturing data about the gesture. Thus, the system may actively seek gesture profile data by prompting the user to perform a gesture. For example, the system may prompt a user with a basic canned gesture or voice command as a demonstration of the default gesture data and request the user to perform the same gesture. Based on the captured image data, the system may set modifications in the gesture profile based for the requested gesture. The user may initiate the modification to the gesture profile by requesting the system to observe the user's performance of a particular gesture.

The system may implicitly identify personalized features of a gesture by capturing data during execution of a task in real-time. For example, the system may capture image data of a user's gesture and passively evolve the gesture sets in the gesture set database 261 with or without the user having knowledge of the modifications. For example, while interacting with an application, the user may perform a number of gestures. The system may identify variations common to a plurality of users with regards to the performance of the gesture from the default or pre-packaged gesture data.

In either case, when the user performs the user's version of that gesture or voice command, the system may track information about the user's gesture and add it to the input gesture database 260. When similarities between failures, or variations, are found between a plurality of user gestures and the gesture data used for gesture recognition, the system may use the compiled data to evolve the gesture data.

It is noted that computing environment 212 is shown coupled to a capture device 202 and executing an application 222 It is contemplated that any computing environment 212, 216, 218, 219 may be executing or be capable of executing an application and any computing environment may be coupled to or otherwise integrate with a capture device 202. For example, the computing environments 212, 216, 218, 219 may each have an optical drive, for example, and allow for a variety of games to be executed from computer readable instructions stored on optical discs. The games may be stored on a storage device within each computing device, such as a hard drive or solid-state drive. Each computing environment 212, 216, 218, 219 may incorporate a capture device, couple to a capture device, or otherwise have the ability to communicate and share information with a capture device. The capture device may be a component of the computing environment.

Figure 3:
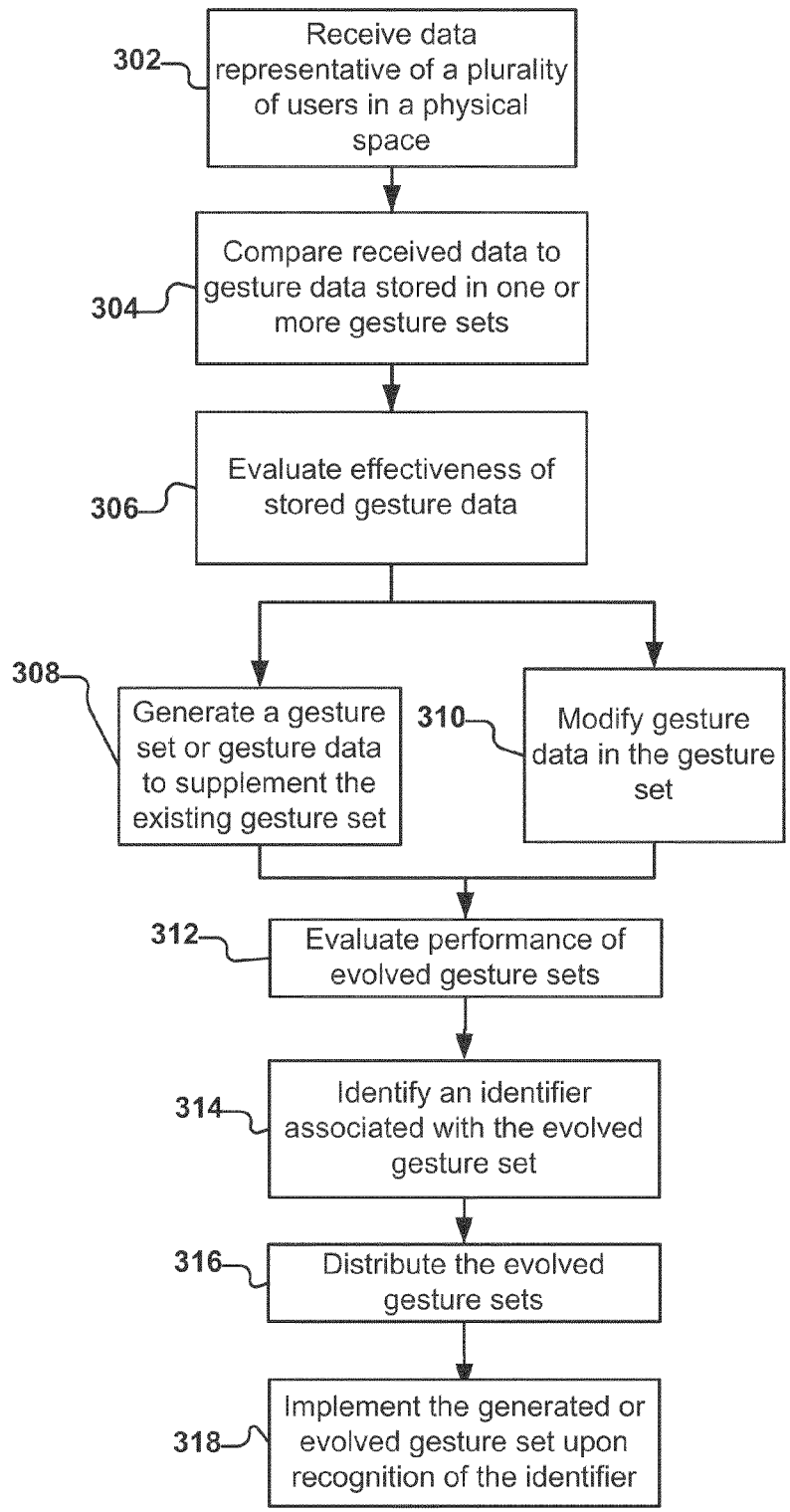
FIG. 3 depicts an example flow diagram for a method of evolving a gesture set.

FIG. 3 illustrates an example flow diagram of the method described herein for identifying and evolving a gesture set. For example, one or more capture devices may be respectively associated with each of the plurality of users and receive data that is representative of each user in the user's respective physical space at 302. The system may compile gesture data from a test group of users, such as by soliciting feedback from volunteers or passively tracking users of the system. The users may be local or remote, and they may be associated with each other or entirely distinct. The capture device may be a depth camera or a plurality of cameras, for example, that communicates with a single computing environment or with a plurality of computing environments. The captured data represents captured data captured separately for each of the users or an aggregation of captured data captured for any combination of users.

At 304, a system such as the gesture-based system described herein, may compare the received data to gesture data stored in one or more gesture sets. The system may analyze, at 306, the effectiveness of the stored gesture data. In an example, the system may recognize that a gesture set, such as a default set of gestures packaged with an application, are not effective for certain users interacting with the system. Rather than forcing a set of gesture data to apply that is ineffective, the system may generate an entirely new set of gesture data based on the data captured at 308 or evolve the gesture set by generating gesture data to supplement the existing gesture set. Alternately or in addition to, the system may evolve the existing gesture set at 310 by modifying gesture data in the gesture data captured from the plurality of users.

At 312, the system may evaluate the performance of the evolved gesture set (or sets). In order to determine whether an update to the universal gesture set is appropriate, tests may be conducted on the test group to determine whether performance improves. For example, test users may be requested to perform a particular gesture and the system can compare the captured gesture data to the stored gesture data.

If the system determines that a new or different gesture is more effective for performing the particular action, the system may update the universal gesture set and associate the gesture set with it an identifier at 314. The identifier may be based on a common feature of the test group and may also indicate applicability, such as whether the gesture set is applicable for all users, for all users sharing one or more characteristics with the test users, for users that do not share a particular characteristic with test users, characteristics of the operating system or application with which the user is interacting, or the like.

The system may distribute the evolved gesture sets at 316. For example, the system may do a software update and distribute the updates to each client hosted by the system. In another example, the system may be the host and may distribute the evolved gesture set to memory or for processing by the system itself. At 314, when the identifier associated with the evolved gesture set is recognized, the gesture set is implemented. For example, following the evolution of a gesture set, the system use the identifier to associate a gesture set to a user for identifying and implementing, at 318, the appropriate gesture set(s) such that a best fit gesture set(s) is implemented for an improved experience for the user.

Figure 4:
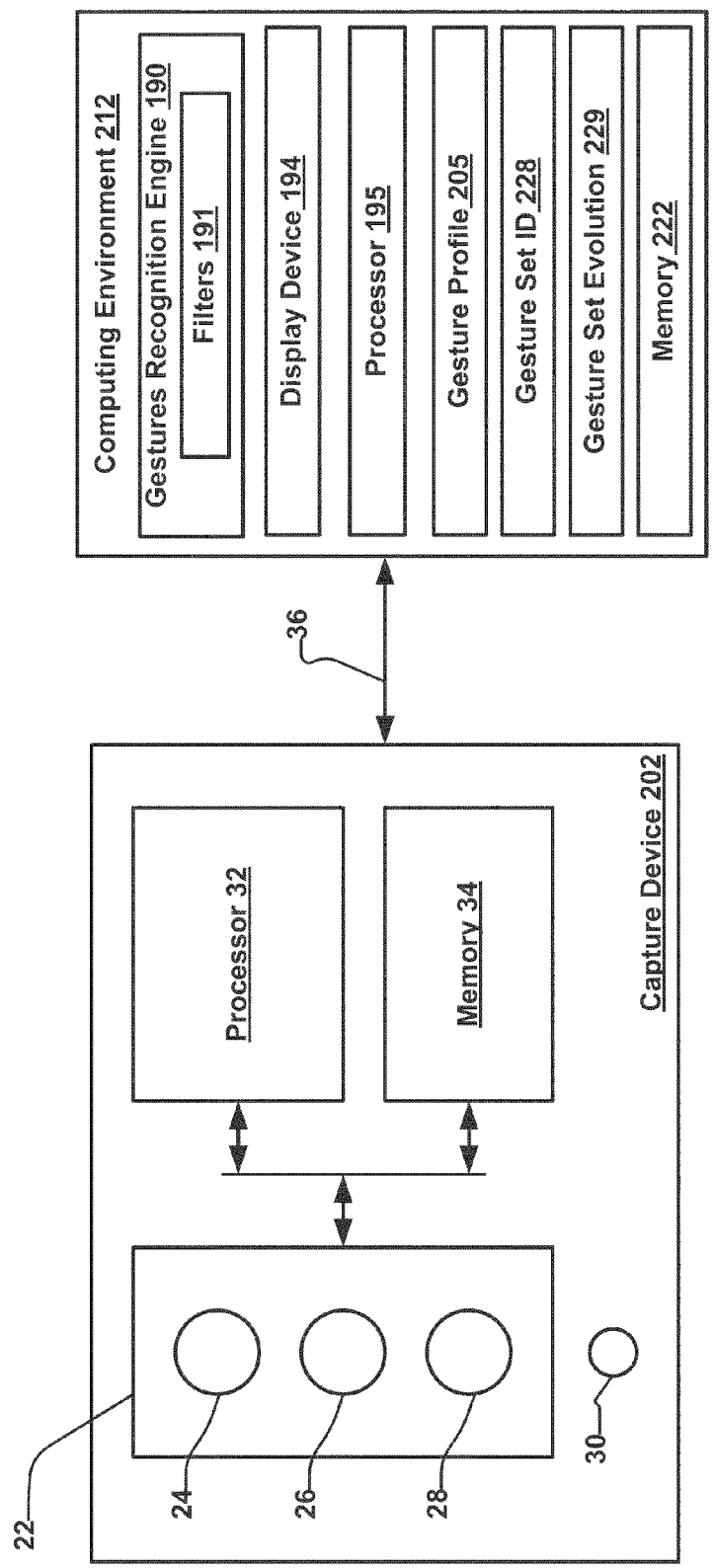
FIG. 4 illustrates an example embodiment of a capture device and computing environment that may be used in a target recognition, analysis, and tracking system.

FIG. 4 illustrates an example embodiment of the capture device 202 that may be used for target recognition, analysis, and tracking, where the target can be a user or an object. According to an example embodiment, the capture device 202 may be configured to capture video with depth information including a depth image that may include depth values via any suitable technique including, for example, time-of-flight, structured light, stereo image, or the like. According to one embodiment, the capture device 202 may organize the calculated depth information into "Z layers," or layers that may be perpendicular to a Z axis extending from the depth camera along its line of sight.

As shown in FIG. 4, the capture device 202 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 4, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 202 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 202 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 202 to a particular location on the targets or objects.

According to another example embodiment, time-of-flight analysis may be used to indirectly determine a physical distance from the capture device 202 to a particular location on the targets or objects by analyzing the intensity of the reflected beam of light over time via various techniques including, for example, shuttered light pulse imaging.

In another example embodiment, the capture device 202 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 202 to a particular location on the targets or objects.

According to another embodiment, the capture device 202 may include two or more physically separated cameras that may view a scene from different angles, to obtain visual stereo data that may be resolved to generate depth information. In another example embodiment, the capture device 202 may use point cloud data and target digitization techniques to detect features of the user.

The capture device 202 may further include a microphone 30, or an array of microphones. The microphone 30 may include a transducer or sensor that may receive and convert sound into an electrical signal. According to one embodiment, the microphone 30 may be used to reduce feedback between the capture device 202 and the computing environment 212 in the target recognition, analysis, and tracking system 10. Additionally, the microphone 30 may be used to receive audio signals that may also be provided by the user to control applications such as game applications, non-game applications, or the like that may be executed by the computing environment 212.

In an example embodiment, the capture device 202 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction. For example, the computer-readable medium may comprise computer executable instructions for receiving data of a scene, wherein the data includes data representative of the target in a physical space. The instructions comprise instructions for gesture profile personalization and gesture profile roaming, as described herein.

The capture device 202 may further include a memory component 34 that may store the instructions that may be executed by the processor 32, images or frames of images captured by the 3-d camera 26 or RGB camera 28, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 4, the capture device 202 may be in communication with the computing environment 212 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 212 may provide a clock to the capture device 202 that may be used to determine when to capture, for example, a scene via the communication link 36.

Additionally, the capture device 202 may provide the depth information and images captured by, for example, the 3-D camera 26 and/or the RGB camera 28, and a skeletal model that may be generated by the capture device 202 to the computing environment 212 via the communication link 36. The computing environment 212 may then use the skeletal model, depth information, and captured images to, for example, control an application such as a game or word processor. For example, as shown, in FIG. 4, the computing environment 212 may include a memory 192 that comprises gesture set data and compiles input gesture data. For example, the memory may store the data represented by gesture set database 260 and input gesture database 261 shown in FIGS. 2A and 2B.

As shown, in FIG. 4, the computing environment 212 may include a gesture set ID module 229 and a gesture set evolution module 229, as described above, and a gestures recognition engine 190. The gestures recognition engine 190 may include a collection of gesture filters 191. A filter may comprise code and associated data that can recognize gestures or otherwise process depth, RGB, or skeletal data. Each filter 191 may comprise information defining a gesture along with parameters, or metadata, for that gesture. For instance, a throw, which comprises motion of one of the hands from behind the rear of the body to past the front of the body, may be implemented as a gesture filter 191 comprising information representing the movement of one of the hands of the user from behind the rear of the body to past the front of the body, as that movement would be captured by a depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time.

While it is contemplated that the gestures recognition engine 190 may include a collection of gesture filters, where a filter may comprise code or otherwise represent a component for processing depth, RGB, or skeletal data, the use of a filter is not intended to limit the analysis to a filter. The filter is a representation of an example component or section of code that analyzes data of a scene received by a system, and comparing that data to base information that represents a gesture. As a result of the analysis, the system may produce an output corresponding to whether the input data corresponds to the gesture. The base information representing the gesture may be adjusted to correspond to the recurring feature in the history of data representative of the user's capture motion. The base information, for example, may be part of a gesture filter as described above. But, any suitable manner for analyzing the input data and gesture data is contemplated.

In an example embodiment, a gesture may be recognized as a trigger for the entry into a modification mode, where a user can modify gesture parameters in the user's gesture profile. For example, a gesture filter 191 may comprise information for recognizing a modification trigger gesture. If the modification trigger gesture is recognized, the application may go into a modification mode. The modification trigger gesture may vary between applications, between systems, between users, or the like. For example, the same gesture in a tennis gaming application may not be the same modification trigger gesture in a bowling game application.

The data captured by the cameras 26, 28 and device 202 in the form of the skeletal model and movements associated with it may be compared to the gesture filters 191 in a gestures library to identify when a user (as represented by the skeletal model) has performed one or more gestures. Thus, inputs to a filter such as filter 191 may comprise things such as joint data about a user's joint position, like angles formed by the bones that meet at the joint, RGB color data from the scene, and the rate of change of an aspect of the user. As mentioned, parameters may be set for the gesture. Outputs from a filter 191 may comprise things such as the confidence that a given gesture is being made, the speed at which a gesture motion is made, and a time at which the gesture occurs.

The computing environment 212 may include a processor 195 that can process the depth image to determine what targets are in a scene, such as a user 18 or an object in the room. This can be done, for instance, by grouping together of pixels of the depth image that share a similar distance value. The image may also be parsed to produce a skeletal representation of the user, where features, such as joints and tissues that run between joints are identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

In an embodiment, the processing is performed on the capture device 202 itself, and the raw image data of depth and color (where the capture device 202 comprises a 3D camera 26) values are transmitted to the computing environment 212 via link 36. In another embodiment, the processing is performed by a processor 32 coupled to the camera 402 and then the parsed image data is sent to the computing environment 212. In still another embodiment, both the raw image data and the parsed image data are sent to the computing environment 212. The computing environment 212 may receive the parsed image data but it may still receive the raw data for executing the current process or application. For instance, if an image of the scene is transmitted across a computer network to another user, the computing environment 212 may transmit the raw data for processing by another computing environment.

The computing environment 212 may use the default or evolved gesture sets such as that shown in FIG. 2 to interpret movements of the skeletal model and to control an application based on the movements. The computing environment 212 can model and display a representation of a user, such as in the form of an avatar or a pointer on a display, such as in a display device 193. Display device 193 may include a computer monitor, a television screen, or any suitable display device. For example, a camera-controlled computer system may capture user image data and display user feedback on a television screen that maps to the user's gestures. The user feedback may be displayed as an avatar on the screen such as shown in FIG. 1. The avatar's motion can be controlled directly by mapping the avatar's movement to those of the user's movements. The user's gestures may be interpreted control certain aspects of the application.

According to an example embodiment, the target may be a human target in any position such as standing or sitting, a human target with an object, two or more human targets, one or more appendages of one or more human targets or the like that may be scanned, tracked, modeled and/or evaluated to generate a virtual screen, compare the user to one or more stored profiles and/or to store a gesture profile 205 associated with the user in a computing environment such as computing environment 212. The gesture profile 205 may be specific to a user, application, or a system. The gesture profile 205 may be accessible via an application or be available system-wide, for example. The gesture profile 205 may include lookup tables for loading specific user profile information. The virtual screen may interact with an application that may be executed by the computing environment 212 described above with respect to FIG. 1.

The gesture profile 205 may include user identification data such as, among other things, the target's scanned or estimated body size, skeletal models, body models, voice samples or passwords, the target's gender, the targets age, previous gestures, target limitations and standard usage by the target of the system, such as, for example a tendency to sit, left or right handedness, or a tendency to stand very near the capture device. This information may be used to determine if there is a match between a target in a capture scene and one or more users. If there is a match, the gesture profiles 205 for the user may be loaded and, in one embodiment, may allow the system to adapt the gesture recognition techniques to the user, or to adapt other elements of the computing or gaming experience according to the gesture profile 205.

One or more gesture profiles 205 may be stored in computer environment 212 and used in a number of user sessions, or one or more profiles may be created for a single session only. Users may have the option of establishing a profile where they may provide information to the system such as a voice or body scan, age, personal preferences, right or left handedness, an avatar, a name or the like. Gesture profiles may also be generated or provided for "guests" who do not provide any information to the system beyond stepping into the capture space. A temporary personal profile may be established for one or more guests. At the end of a guest session, the guest gesture profile may be stored or deleted.

The gestures set identification module 228, gesture recognition engine 190, and gesture set evolution module 229 may be implemented in hardware, software or a combination of both. For example, the gestures set identification module 228, gesture recognition engine 190, and gesture set evolution module 229 may be implemented as software that executes on a processor, such as processor 195, of the computing environment 212 (or on processing unit 101 of FIG. 6 or processing unit 259 of FIG. 7).

It is emphasized that the block diagrams depicted in FIG. 4 and FIGS. 6 and 7 described below are exemplary and not intended to imply a specific implementation. Thus, the processor 195 or 32 in FIG. 4, the processing unit 101 of FIG. 6, and the processing unit 259 of FIG. 7, can be implemented as a single processor or multiple processors. Multiple processors can be distributed or centrally located. For example, the gestures recognition engine 190 may be implemented as software that executes on the processor 32 of the capture device or it may be implemented as software that executes on the processor 195 in the computing environment 212. Any combinations of processors that are suitable for performing the techniques disclosed herein are contemplated. Multiple processors can communicate wirelessly, via hard wire, or a combination thereof.

As described above, the gestures library and filter parameters may be tuned for an application or a context of an application by a gesture tool, such as a cultural or environmental context. Similarly, there may be different contexts among different environments of a single application. Take a first-user shooter game that involves operating a motor vehicle. While the user is on foot, making a fist with the fingers towards the ground and extending the fist in front and away from the body may represent a punching gesture. While the user is in the driving context, that same motion may represent a "gear shifting" gesture.

Gestures may be grouped together into genre packages of complimentary gestures that are likely to be used by an application in that genre. Complimentary gestures—either complimentary as in those that are commonly used together, or complimentary as in a change in a parameter of one will change a parameter of another—may be grouped together into genre packages. These packages may be provided to an application, which may select at least one. The application may tune, or modify, the parameter of a gesture or gesture filter 191 to best fit the unique aspects of the application. When that parameter is tuned, a second, complimentary parameter (in the inter-dependent sense) of either the gesture or a second gesture is also tuned such that the parameters remain complimentary. Genre packages for video games may include genres such as first-user shooter, action, driving, and sports.

Figure 5A:
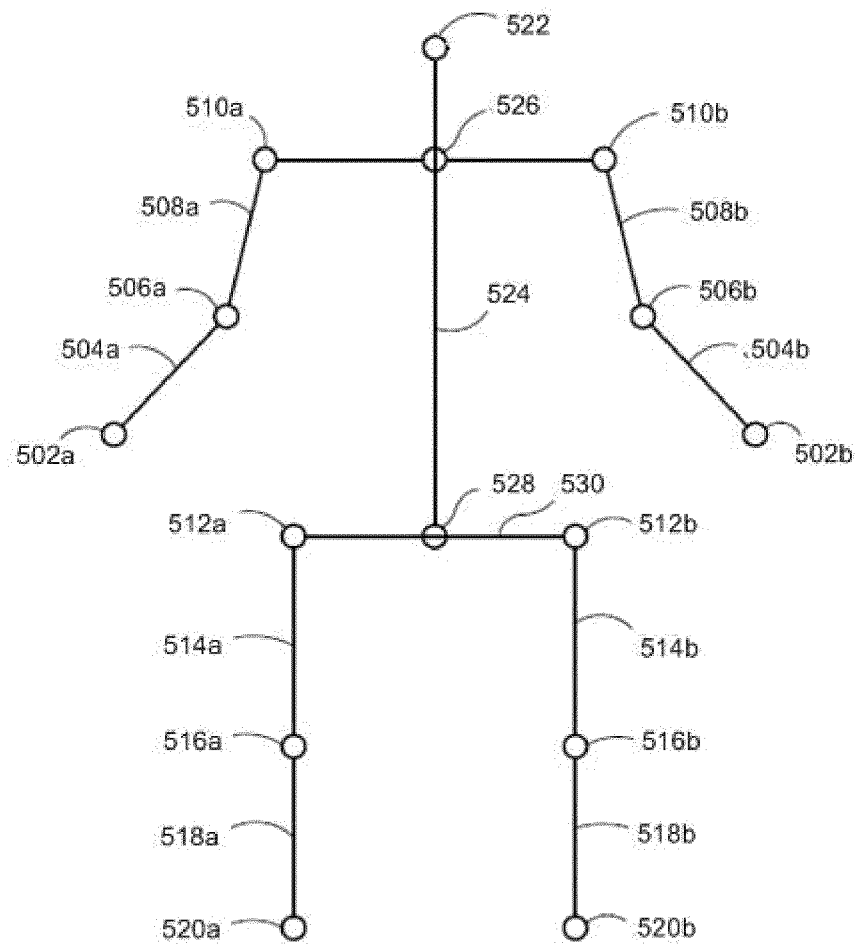
FIG. 5A illustrates a skeletal mapping of a user that has been generated from a target recognition, analysis, and tracking system such as that shown in FIG. 4.

FIG. 5A depicts an example skeletal mapping of a user that may be generated from the capture device 202. In this embodiment, a variety of joints and bones are identified: each hand 502a and 502b, each forearm 504a and 504b, each elbow 506a and 506b, each bicep 508a and 508b, each shoulder 510a and 510b, each hip 512a and 512b, each thigh 514a and 514b, each knee 516a and 516b, each foreleg 518a and 518b, each foot 520a and 520b, the head 522, the torso 524, the top 526 and bottom 528 of the spine, and the waist 530. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 504 in front of his torso 524. A gesture may be a single movement (e.g., a jump) or a continuous gesture (e.g., driving), and may be short in duration or long in duration (e.g., driving for 202 minutes). A gesture may also incorporate props, such as by swinging a mock sword. A gesture may comprise more than one body part, such as clapping the hands 502 together, or a subtler motion, such as pursing one's lips.

A user's gestures may be used for input in a general computing context. For instance, various motions of the hands 502 or other body parts may correspond to common system wide tasks such as navigate up or down in a hierarchical list, open a file, close a file, and save a file. For instance, a user may hold his hand with the fingers pointing up and the palm facing the capture device 202. He may then close his fingers towards the palm to make a fist, and this could be a gesture that indicates that the focused window in a window-based user-interface computing environment should be closed. Gestures may also be used in a video-game-specific context, depending on the game. For instance, with a driving game, various motions of the hands 502 and feet 520 may correspond to steering a vehicle in a direction, shifting gears, accelerating, and breaking. Thus, a gesture may indicate a wide variety of motions that map to a displayed user representation, and in a wide variety of applications, such as video games, text editors, word processing, data management, etc.

A user may generate a gesture that corresponds to walking or running, by walking or running in place himself. For example, the user may alternately lift and drop each leg 512-520 to mimic walking without moving. The system may parse this gesture by analyzing each hip 512 and each thigh 514. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters. Information related to the gesture may be stored for purposes of pre-canned gesture animation.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 520 leave the ground entirely. The system may parse the skeleton for this gesture by analyzing the angle relation of the shoulders 510, hips 512 and knees 516 to see if they are in a position of alignment equal to standing up straight. Then these points and upper 526 and lower 528 spine points may be monitored for any upward acceleration. A sufficient combination of acceleration may trigger a jump gesture. A sufficient combination of acceleration with a particular gesture may satisfy the parameters of a transition point.

Given this "heel lift jump" gesture, an application may set values for parameters associated with this gesture. The parameters may include the above acceleration threshold, which determines how fast some combination of the user's shoulders 510, hips 512 and knees 516 must move upward to trigger the gesture, as well as a maximum angle of alignment between the shoulders 510, hips 512 and knees 516 at which a jump may still be triggered. The outputs may comprise a confidence level, as well as the user's body angle at the time of the jump.

Setting parameters for a gesture based on the particulars of the application that will receive the gesture are important in accurately identifying gestures. Properly identifying gestures and the intent of a user greatly helps in creating a positive user experience.

An application may set values for parameters associated with various transition points to identify the points at which to use pre-canned animations. Transition points may be defined by various parameters, such as the identification of a particular gesture, a velocity, an angle of a target or object, or any combination thereof. If a transition point is defined at least in part by the identification of a particular gesture, then properly identifying gestures assists to increase the confidence level that the parameters of a transition point have been met.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 502-510 to full length while making the grab gesture. In this situation, a similar grab gesture where the user only partially extends his arm 502-510 may not achieve the result of interacting with the ball. Likewise, a parameter of a transition point could be the identification of the grab gesture, where if the user only partially extends his arm 502-510, thereby not achieving the result of interacting with the ball, the user's gesture also will not meet the parameters of the transition point.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 510a, and on the same side of the head 522 as the throwing arm 502a-310a. It may not be necessary to define all bounds of a volume, such as with this throwing gesture, where an outer bound away from the body is left undefined, and the volume extends out indefinitely, or to the edge of scene that is being monitored.

Figure 5B:
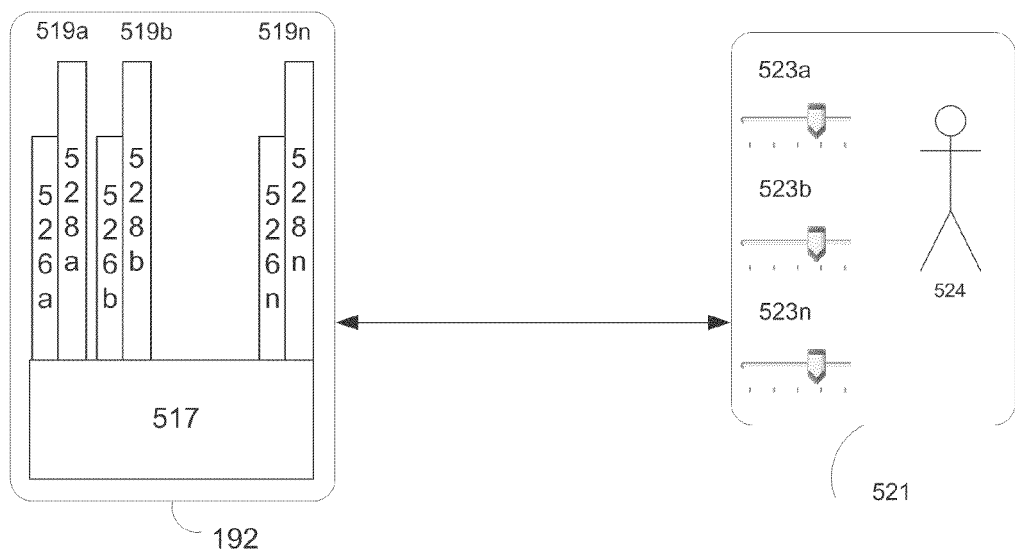
FIG. 5B illustrates further details of a gesture recognizer architecture such as that shown in FIG. 4.

FIG. 5B provides further details of one exemplary embodiment of the gesture recognizer engine 190 of FIG. 4. As shown, the gesture recognizer engine 190 may comprise at least one filter 519 to determine a gesture or gestures. A filter 519 comprises information defining a gesture 526 (hereinafter referred to as a "gesture"), and may comprise at least one parameter 528, or metadata, for that gesture 526. For instance, a throw, which comprises motion of one of the hands from behind the rear of the body to past the front of the body, may be implemented as a gesture 526 comprising information representing the movement of one of the hands of the user from behind the rear of the body to past the front of the body, as that movement would be captured by the depth camera. Parameters 528 may then be set for that gesture 526. Where the gesture 526 is a throw, a parameter 528 may be a threshold velocity that the hand has to reach, a distance the hand must travel (either absolute, or relative to the size of the user as a whole), and a confidence rating by the recognizer engine 190 that the gesture 526 occurred. These parameters 528 for the gesture 526 may vary between applications, between contexts of a single application, or within one context of one application over time.

Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine 190 architecture. For instance, there may be a first filter for driving that takes as input skeletal data and outputs a confidence that the gesture 526 associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter 528. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

The gesture recognizer engine 190 may have a base recognizer engine 517 that provides functionality to a gesture filter 519. In an embodiment, the functionality that the recognizer engine 517 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

The base recognizer engine 517 may include a gesture profile 520. For example, the base recognizer engine 517 may load a gesture profile 520 into the gesture recognition engine temporarily for a user, store the gesture profile 520 with the gesture filter information, or otherwise access the gesture profile 520 from a remote location. The gesture profile 520 may provide parameters that adapt the information in the filters 519 to correspond to a specific user. For example, as described above, a gesture 526 may be a throw having a parameter 528 for a threshold velocity or a distance the hand must travel. The gesture profile 520 may redefine the threshold velocity or a distance the hand must travel for the throwing gesture 526. The base recognizer engine 517, therefore, may supplement or replace parameters in the filter 519 with parameters from the gesture profile 520. The filters 519 may be default gesture information and the gesture profile 520 may be loaded specifically for a particular user.

Filters 519 are loaded and implemented on top of the base recognizer engine 517 and can utilize services provided by the engine 517 to all filters 519. In an embodiment, the base recognizer engine 517 processes received data to determine whether it meets the requirements of any filter 519. Since these provided services, such as parsing the input, are provided once by the base recognizer engine 517 rather than by each filter 519, such a service need only be processed once in a period of time as opposed to once per filter 519 for that period, so the processing required to determine gestures is reduced.

An application may use the filters 519 provided by the recognizer engine 190, or it may provide its own filter 519, which plugs in to the base recognizer engine 517. Similarly, the gesture profile may plug in to the base recognizer engine 517. In an embodiment, all filters 519 have a common interface to enable this plug-in characteristic. Further, all filters 519 may utilize parameters 528, so a single gesture tool as described below may be used to debug and tune the entire filter system 519.

These parameters 528 may be tuned for an application or a context of an application by a gesture tool 521. In an embodiment, the gesture tool 521 comprises a plurality of sliders 523, each slider 523 corresponding to a parameter 528, as well as a pictorial representation of a body 524. As a parameter 528 is adjusted with a corresponding slider 523, the body 524 may demonstrate both actions that would be recognized as the gesture with those parameters 528 and actions that would not be recognized as the gesture with those parameters 528, identified as such. This visualization of the parameters 528 of gestures provides an effective means to both debug and fine tune a gesture.

FIG. 6 illustrates an example embodiment of a computing environment that may be used to interpret one or more gestures in a target recognition, analysis, and tracking system. The computing environment such as the computing environment 212 described above may be a multimedia console 100, such as a gaming console. As shown in FIG. 6, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 2120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 2124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs.), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 202 may define additional input devices for the console 100.

Figure 7:
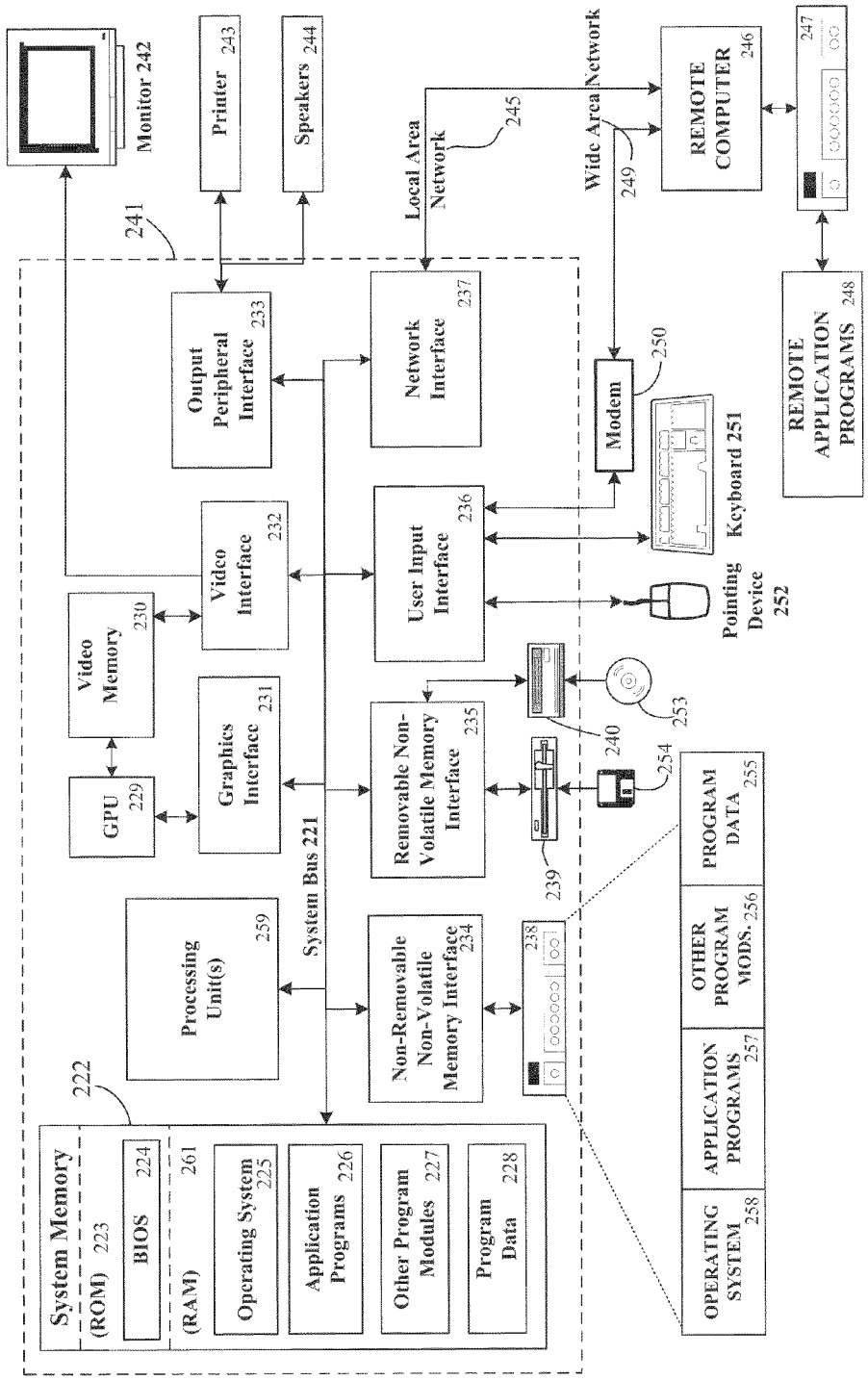
FIG. 7 illustrates another example embodiment of a computing environment in which the techniques described herein may be embodied.

FIG. 7 illustrates another example embodiment of a computing environment 220 that may be the computing environment 212 shown in FIG. 1 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 7, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 261. A basic input/output system 224 (BIOS), containing the basic routines that help to transfer information between elements within computer 241, such as during start-up, is typically stored in ROM 223. RAM 261 typically contains data and/or program modules that are immediately accessible to and/or presently being operated on by processing unit 259. By way of example, and not limitation, FIG. 6 illustrates operating system 225, application programs 226, other program modules 227, and program data 228.

The computer 241 may also include other removable/non-removable, volatile/nonvolatile computer storage media. By way of example only, FIG. 7 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 7, provide storage of computer readable instructions, data structures, program modules and other data for the computer 241. In FIG. 7, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 202 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 8. The logical connections depicted in FIG. 6 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 6 illustrates remote application programs 248 as residing on memory device 247. It will be appreciated that the network connections shown are exemplary and other means of establishing a communications link between the computers may be used.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Furthermore, while the present disclosure has been described in connection with the particular aspects, as illustrated in the various figures, it is understood that other similar aspects may be used or modifications and additions may be made to the described aspects for performing the same function of the present disclosure without deviating therefrom. The subject matter of the present disclosure includes all novel and non-obvious combinations and sub-combinations of the various processes, systems and configurations, and other features, functions, acts, and/or properties disclosed herein, as well as any and all equivalents thereof. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments.

In addition to the specific implementations explicitly set forth herein, other aspects and implementations will be apparent to those skilled in the art from consideration of the specification disclosed herein. Therefore, the present disclosure should not be limited to any single aspect, but rather construed in breadth and scope in accordance with the appended claims. For example, the various procedures described herein may be implemented with hardware or software, or a combination of both.

What is claimed:

1. A method for evolving a gesture set in a gesture-based system, the method comprising:
    capturing data representative of a user in a physical space;
    processing the captured data to identify a first motion or pose for the user, the first motion or pose for the user being processed to determine a first confidence level that the first motion or pose is the same as a computer representation of a motion or pose for a particular gesture that invokes an input command to modify a visual output of a computer, wherein the first motion or pose is processed to generate values for parameters associated with the particular gesture in a gesture filter, said first confidence level indicating a likelihood that the values of the parameters associated with the first motion or pose correspond to the values of the parameters of the particular gesture so as to cause the first motion or pose to be recognized as the particular gesture by the gesture filter to, in turn, invoke the input command to modify the visual output of the computer; and
    modifying the computer representation of the motion or pose invoking the input command based on the first motion or pose by the user such that subsequently captured data of the user or another user performing the first motion or pose is processed to determine a second confidence level that the first motion or pose is the same as the modified computer representation of the motion or pose for the particular gesture, said second confidence level indicating a likelihood that the values of the parameters associated with the subsequently captured first motion or pose correspond to the values of the parameters of the particular gesture so as to cause the subsequently captured first motion or pose to be recognized as the particular gesture by the gesture filter to, in turn, invoke the input command to modify the visual output of the computer, the second confidence level being greater than the first confidence level.

2. The method of claim 1, further comprising:
    associating an identifier with the modified computer representation of the motion or pose, the identifier identifying a basis for why the first motion or pose from the user may fail to be recognized as the particular gesture and/or as a basis for implementing the modified computer representation of the motion or pose rather than computer representation of the motion or pose in evaluating subsequently captured data.

3. The method of claim 2, wherein the identifier comprises an indication of an operating system, an application, the user or another user, a feature of the user or another user, a location, a type of application, a hardware configuration, a software configuration, a culture, a geography, a demography, a linguistic characteristic, or a style.

4. The method of claim 1, wherein the user is selected by the gesture-based system by a passive request.

5. The method of claim 1, wherein the computer representation of the motion or pose is modified at a server computer of the gesture-based system, further comprising:
    distributing the modified computer representation of the motion or pose from the server computer to client computers of the gesture-based system.

6. The method of claim 1, wherein processing the captured data to identify a first motion or pose for the user, the first motion or pose for the user being processed to determine the first confidence level that the motion or pose is the same as the computer representation of the motion or pose for a particular gesture that invokes an input command to modify the visual output of the computer comprises:
    determining the first confidence level based on a first amount of variation between the first motion or pose for the user and the computer representation of the motion or pose; and
    wherein modifying the computer representation of the motion or pose invoking the input command based on the first user motion or pose by the user such that subsequently captured data of the user or another user performing the first motion or pose is processed to determine the second confidence level that the motion or pose is the same as the modified computer representation of the motion or pose for the particular gesture comprises:
    determining the second confidence level based on a second amount of variation between the first motion or pose for the user and the modified computer representation of the motion or pose, the first amount of variation being greater than the second amount of variation.

7. The method of claim 1, further comprising:
    capturing second data representative of a second user in the physical space or a second physical space;
    processing the second captured data to identify a second motion or pose for the second user, the second motion or pose being processed to determine a third confidence level that the second motion or pose is the same as the computer representation of the motion or pose for the particular gesture, wherein the second motion or pose is processed to generate values for parameters associated with the particular gesture in the gesture filter, said third confidence level indicating a likelihood that the values of the parameters associated with the second motion or pose correspond to the values of the parameters of the particular gesture so as to cause the second motion or pose to be recognized as the particular gesture by the gesture filter to, in turn, invoke the input command to modify the visual output of the computer; and
    wherein modifying the computer representation of the motion or pose invoking the input command based on the first motion or pose by the user comprises modifying the computer representation based on the first motion or pose and the second motion or pose.

8. The method of claim 7, further comprising:
    determining to modify the computer representation based on the first motion or pose and the second motion or pose

39 in response to determining that the first user and the second user share a demographic characteristic, a language, or a culture.

9. The method of claim 7, further comprising:
determining to process third data representative of a third user using the modified computer representation of the motion or pose in response to determining that the third user shares a demographic characteristic, a language, or a culture with the first and second users.

10. The method of claim 7, further comprising:
determining to process third data representative of a third user using a computer representation of the motion or pose that differs from the modified computer representation of the motion or pose in response to determining that the third user differs in a demographic characteristic, a language, or a culture from the first and second users.

11. The method of claim 7, wherein the first user is located in the physical space, the second user is located in the second physical space, a first capture device is used to capture the data representative of the user in the physical space, and a second capture device is used to capture the second data representative of the second user in the second physical space, said first and second capture devices both being associated with said gesture-based system.

12. A computer-readable storage device for associating a gesture set to a user, bearing computer-readable instructions that, when executed on the computer, cause the computer to perform operations comprising:
capturing data representative of a user in a physical space;
processing the captured data to identify a first motion or pose for the user, the first motion or pose for the user being processed to determine a first confidence level that the first motion or pose is the same as a computer representation of a motion or pose for a particular gesture that invokes an input command to modify a visual output of a computer, including processing the first motion or pose to generate values for parameters associated with the particular gesture in a gesture filter, said first confidence level indicating a likelihood that the values of the parameters associated with the first motion or pose correspond to the values of the parameters of the particular gesture so as to cause the first motion or pose to be recognized as the particular gesture by the gesture filter to, in turn, invoke the input command to modify the visual output of the computer; and
modifying the computer representation of the motion or pose invoking the input command based on the first motion or pose by the user such that subsequently captured data of the user or another user performing the first motion or pose is processed to determine a second confidence level that the first motion or pose is the same as the modified computer representation of the motion or pose for the particular gesture, said second confidence level indicating a likelihood that the values of the parameters associated with the subsequently captured first motion or pose correspond to the values of the parameters of the particular gesture so as to cause the subsequently captured first motion or pose to be recognized as the particular gesture by the gesture filter to, in turn, invoke the input command to modify the visual output of the computer, the second confidence level being greater than the first confidence level.

13. The computer-readable storage device of claim 12, further comprising:
correlating at least one feature of the user's motion or pose to an identifier associated with the modified computer representation of the motion or pose, and implementing the modified computer representation of the motion or pose associated with the identifier.

14. The computer-readable storage device of claim 13, wherein the identifier identifies at least one of an operating system, an application, the user or another user, a feature of the user or another user, a location, a type of application, a hardware configuration, a software configuration, a culture, a current user, a geography, a demography, a linguistic characteristic, or a style.

15. The computer-readable storage device of claim 12, wherein processing the captured data to identify a first motion or pose for the user, the first motion or pose for the user being processed to determine the first confidence level that the motion or pose is the same as the computer representation of the motion or pose for a particular gesture that invokes an input command to modify the visual output of the computer comprises:
determining the first confidence level based on a first amount of variation between the first motion or pose for the user and the computer representation of the motion or pose; and
wherein modifying the computer representation of the motion or pose invoking the input command based on the first user motion or pose by the user such that subsequently captured data of the user or another user performing the first motion or pose is processed to determine the second confidence level that the motion or pose is the same as the modified computer representation of the motion or pose for the particular gesture comprises:
determining the second confidence level based on a second amount of variation between the first motion or pose for the user and the modified computer representation of the motion or pose, the first amount of variation being greater than the second amount of variation.

16. A system for evolving gesture recognition data, the system comprising:
a processor; and
a memory communicatively coupled to the processor when the system is operational, the memory bearing processor-executable instructions that, when executed on the processor, cause the system at least to:
capture data representative of a user in a physical space;
process the captured data to identify a first motion or pose for the user, the first motion or pose for the user being processed to determine a first confidence level that the first motion or pose is the same as a computer representation of a motion or pose for a particular gesture that invokes an input command to modify a visual output of a computer, wherein the first motion or pose is processed to generate values for parameters associated with the particular gesture in a gesture filter, said first confidence level indicating a likelihood that the values of the parameters associated with the first motion or pose correspond to the values of the parameters of the particular gesture so as to cause the first motion or pose to be recognized as the particular gesture by the gesture filter to, in turn, invoke the input command to modify the visual output of the computer; and
modify the computer representation of the motion or pose invoking the input command based on the first motion or pose by the user such that subsequently captured data of the user or another user performing the first motion or pose is processed to determine a second confidence level that the first motion or pose is the same as the modified computer representation of the motion or pose for the particular gesture, said second confidence level indicating a likelihood that the values of the parameters associated with the subsequently captured first motion or pose correspond to the values of the parameters of the particular gesture so as to cause the subsequently captured first motion or pose to be recognized as the particular gesture by the gesture filter to, in turn, invoke the input command to modify the visual output of the computer, the second confidence level being greater than the first confidence level.

17. The system of claim 16, wherein the memory further bears instructions that, when executed on the processor, cause the system at least to:
associate an identifier with the modified computer representation of the motion or pose, the identifier identifying a basis for why the first motion or pose from the user may fail to be recognized as the particular gesture and/or as a basis for implementing the modified computer representation of the motion or pose rather than the computer representation of the motion or pose in evaluating the subsequently captured data.

18. The system of claim 16, wherein the memory further bears instructions that, when executed on the processor, cause the system at least to:
capture second data representative of a second user in the physical space or a second physical space;
process the second captured data to identify a second motion or pose for the second user, the second motion or pose being processed to determine a third confidence level that the second motion or pose is the same as the computer representation of the motion or pose for the particular gesture, wherein the second motion or pose is processed to generate values for parameters associated with the particular gesture in the gesture filter, said third confidence level indicating a likelihood that the values of the parameters associated with the second motion or pose correspond to the values of the parameters of the particular gesture so as to cause the second motion or pose to be recognized as the particular gesture by the gesture filter to, in turn, invoke the input command to modify the visual output of the computer; and
wherein the instructions that, when executed on the processor, cause the system at least to modify the computer representation of the motion or pose invoking the input command based on the first motion or pose by the user further cause the system at least to modify the computer representation based on the first motion or pose and the second motion or pose.

19. The system of claim 18, wherein the memory further bears instructions that, when executed on the processor, cause the system at least to:
determine to modify the computer representation based on the first motion or pose and the second motion or pose in response to determining that the first user and the second user share a demographic characteristic, a language, or a culture.

20. The system of claim 18, wherein the memory further bears instructions that, when executed on the processor, cause the system at least to:
determine to process third data representative of a third user using the modified computer representation of the motion or pose in response to determining that the third user shares a demographic characteristic, a language, or a culture with the first and second users.

* * * * *